(12) United States Patent
Muniraju et al.

(10) Patent No.: US 11,892,921 B2
(45) Date of Patent: Feb. 6, 2024

(54) TECHNIQUES FOR PACKAGE INJECTION FOR VIRTUAL MACHINE CONFIGURATION

(71) Applicant: Rubrik, Inc., Palo Alto, CA (US)

(72) Inventors: Muraliraja Muniraju, Fremont, CA (US); Joseph Michael Harlan, Leander, TX (US)

(73) Assignee: Rubrik, Inc., Palo Alto, CA (US)

( * ) Notice: Subject to any disclaimer, the term of this patent is extended or adjusted under 35 U.S.C. 154(b) by 232 days.

(21) Appl. No.: 17/570,522

(22) Filed: Jan. 7, 2022

(65) Prior Publication Data
US 2023/0222041 A1 Jul. 13, 2023

(51) Int. Cl.
*G06F 11/20* (2006.01)
*G06F 9/455* (2018.01)

(52) U.S. Cl.
CPC ...... *G06F 11/2033* (2013.01); *G06F 9/45558* (2013.01); *G06F 2009/45591* (2013.01)

(58) Field of Classification Search
CPC ............. G06F 11/2033; G06F 9/45558; G06F 2009/45591; G06F 9/44505; G06F 11/1484
See application file for complete search history.

(56) References Cited

U.S. PATENT DOCUMENTS 8,429,649 B1 * 4/2013 Feathergill .......... G06F 9/45558
718/1

* cited by examiner

*Primary Examiner* — Matthew M Kim
*Assistant Examiner* — Kyle Emanuele
(74) *Attorney, Agent, or Firm* — Holland & Hart LLP

(57) ABSTRACT

A method of managing a virtual machine environment is described. According to the method, a cloud application that is used for management of a plurality of virtual machines may receive, from a first virtual machine, an indication of one or more configuration parameters associated with the first virtual machine. The cloud application may generate an executable package based on metadata associated with the first virtual machine. The executable package may be configured to be executable by a set of default drivers on a second virtual machine upon bootup of the second virtual machine to configure the second virtual machine in accordance with the one or more configuration parameters. The cloud application may transmit, to the second virtual machine, the executable package for configuring the second virtual machine in accordance with the one or more configuration parameters.

20 Claims, 12 Drawing Sheets

TECHNIQUES FOR PACKAGE INJECTION FOR VIRTUAL MACHINE CONFIGURATION

FIELD OF TECHNOLOGY

The present disclosure relates generally to database systems and data processing, and more specifically to techniques for package injection for virtual machine configuration.

BACKGROUND

A computing system may be employed to manage, process, backup, and restore data using a network of computing devices.

Some data management systems may utilize virtual machines to support data management at a plurality of storage devices. In some examples, a data management system may periodically generate snapshots of a virtual machine, and the snapshot may represent a current state of the virtual machine. If a virtual machine fails, a failover procedure may be used to replicate the virtual machine using a snapshot.

DETAILED DESCRIPTION

Figure 1:
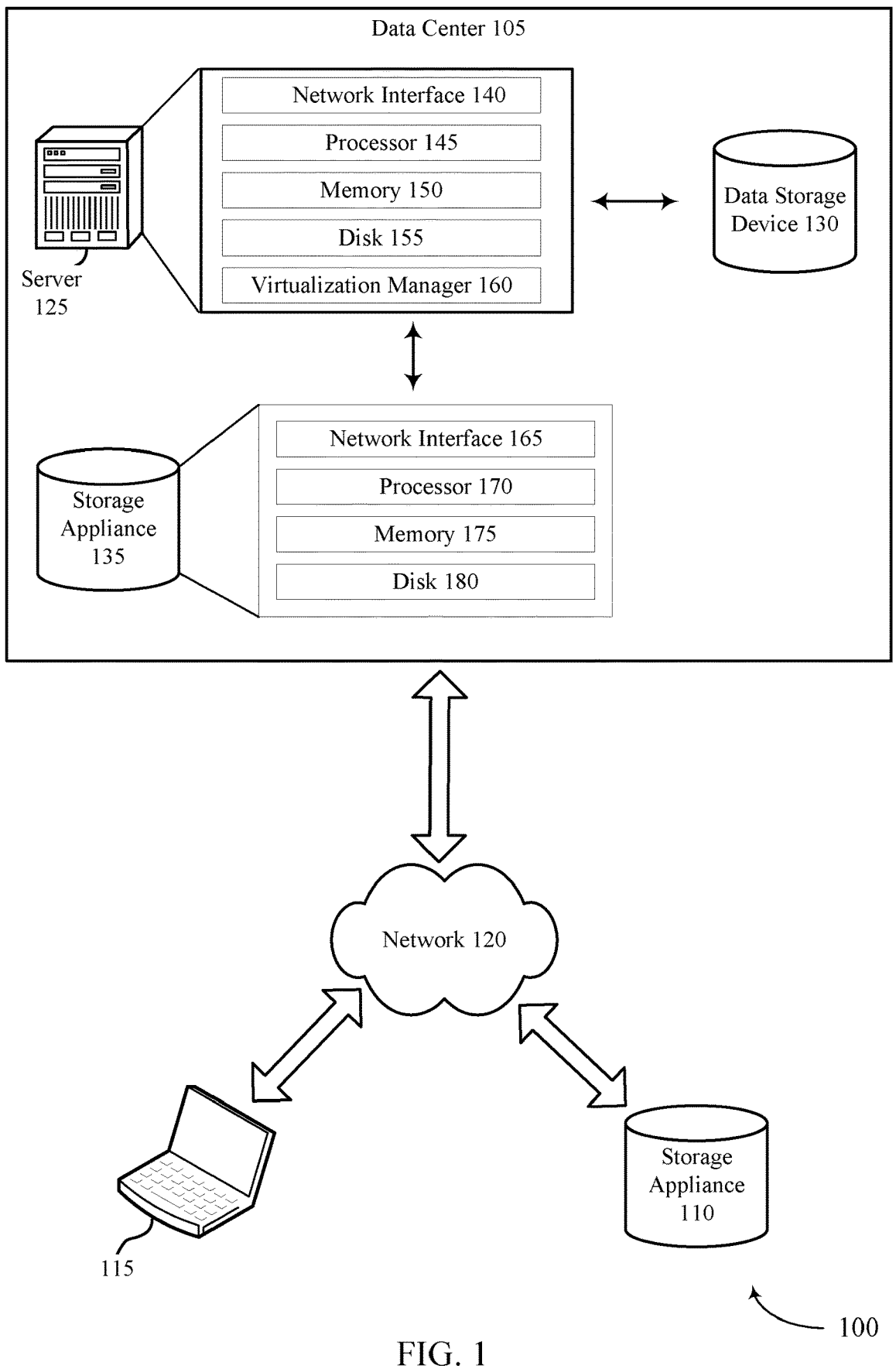
FIG. 1 illustrates an example of a computing environment that supports techniques for package injection for virtual machine configuration in accordance with aspects of the present disclosure.

Some computing systems may utilize virtual machines to support application execution and management of data associated with the applications. For example, the virtual machines may support a webserver, a database server, or logic for other types of service. The virtual machine may virtualize a set of physical computing systems (e.g., data storage devices) in order to manage data storage, processing, and retrieval for application support. In some examples, these computing systems may periodically generate snapshots of a virtual machine, and the snapshot may represent a current state of the virtual machine. If a virtual machine fails, a failover procedure may be used to replicate the virtual machine using a snapshot.

The failover procedure may be implemented as a service that supports disaster recovery. The service may be an orchestrated solution that is used to generate or replicate an environment on a new computing cluster including the transfer of data from the failed cluster to the new cluster. The environment may include the virtual machines as well as the applications supported by the virtual machines.

In some cases, an agent may be configured on a source virtual machine and used to support the failover procedure. The agent may be configured to periodically poll for and execute configurations of the virtual machine. Such configurations may include network configurations. The configurations may be retrieved from a shared location of the virtual machine and executed by or configured at the virtual machine by the agent.

When an agent is installed on a virtual machine, and a snapshot is taken of the virtual machine, replication of the virtual machine to another computing system (e.g., a target computing system) may require that the agent be installed on the target. More particularly, because the agent is captured in the snapshot, when the snapshot is used for replication, the agent is installed on the target system. Thus, during replication, the agent may be installed on the target system and used to install the configurations as included in a shared location.

In some cases, agents may not be installed on some systems due to security concerns or other conditions. For example, an agent may require root privileges, and administrators may be hesitant to grant such access to the agents. Further, the failover service may be configured to replicate a snapshot to a target system using an agent. However, if the snapshot did not have an agent, then the failover service may be inoperable.

Implementations described herein support an agentless failover procedure using a package ingestion technique. A management platform (e.g., a cloud application), which may be implemented as a cloud service, may receive configuration parameters associated with an online virtual machine. During the failover recovery procedure, the cloud application may be used to generate an executable package that includes the instructions for configuring the configuration parameters at a target computing system, and upon booting of the replicated virtual machine, the package is executed to install the configurations and to perform other customizations (e.g., reporting scripts) that are part of the package. The package may be generated based on the metadata associated with the source virtual machine, and the metadata may include the operating system type, among other parameters. This procedure functions to reduce the amount of time to perform the failover procedure, thereby increasing uptime for various applications and services supported by the virtual machines. In some examples, the described package injection procedure may be used outside the context of failover recovery procedures (e.g., to perform installations or customizations at a virtual machine).

Aspects of the disclosure are initially described in the context of an environment supporting on-demand data backup and retrieval services. Aspects of the disclosure are further described with reference to a computing environment illustrating communications that support package injections for virtual machine configurations. Aspects of the disclosure are further illustrated by and described with reference to apparatus diagrams, system diagrams, and flowcharts that relate to techniques for package injection for virtual machine configuration.

FIG. 1 illustrates an example of a computing environment 100 for cloud computing that supports techniques for package injection for virtual machine configuration in accordance with various aspects of the present disclosure. The computing environment 100 may include a data center 105, a storage appliance 110, and a computing device 115 in communication with each other via one or more networks 120. The computing environment 100 may also include one or more computing devices interconnected through one or more networks 120. The one or more networks 120 may allow computing devices or storage devices to connect to and communicate with other computing devices or other storage devices. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 105 may include one or more servers, such as server 125, in communication with one or more storage devices, such as storage device 130. The one or more servers may also be in communication with one or more storage appliances, such as storage appliance 135. The server 125, storage device 130, and storage appliance 135 may be in communication with each other via a networking fabric connecting servers and data storage units within the data center 105 to each other. The storage appliance 135 may include a data management system for backing up virtual machines or files within a virtualized infrastructure. The server 125 may be used to create and manage one or more virtual machines associated with a virtualized infrastructure.

The one or more virtual machines may run various applications, such as a database application or a web server. The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a data center, such as data center 105, may include multiple servers and/or data storage devices in communication with each other. The one or more data storage devices 130 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 120 may include a secure network such as an enterprise private network, an unsecure network such as a wireless open network, a local area network (LAN), a wide area network (WAN), and the Internet. The one or more networks 120 may include a cellular network, a mobile network, a wireless network, or a wired network. Each network of the one or more networks 120 may include hubs, bridges, routers, switches, and wired transmission media such as a direct-wired connection. The one or more networks 120 may include an extranet or other private network for securely sharing information or providing controlled access to applications or files.

A server, such as server 125, may allow a client to download information or files (e.g., executable, text, application, audio, image, or video files) from the server 125 or to perform a search query related to particular information stored on the server 125. In some examples, a server may act as an application server or a file server. In general, server 125 may refer to a hardware device that acts as the host in a client-server relationship or a software process that shares a resource with or performs work for one or more clients.

One example of server 125 includes a network interface 140, processor 145, memory 150, disk 155, and virtualization manager 160 all in communication with each other. Network interface 140 allows server 125 to connect to one or more networks 120. Network interface 140 may include a wireless network interface and/or a wired network interface. Processor 145 allows server 125 to execute computer-readable instructions stored in memory 150 in order to perform processes described herein. Processor 145 may include one or more processing units, such as one or more CPUs and/or one or more GPUs. Memory 150 may comprise one or more types of memory (e.g., random access memory (RAM), static-RAM (SRAM), dynamic-RAM (DRAM), read-only memory (ROM), electric erasable programmable ROM (EEPROM), Flash, etc.). Disk 155 may include a hard disk drive and/or a solid-state drive. Memory 150 and disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as storage appliance 135. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance 135 or storage appliance 110 of FIG. 1, described further below) in response to a request made by the storage appliance. After the data associated with the point in time snapshot of the virtual machine has been transferred to the storage appliance 135, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage appliance 170 may include a network interface 175, processor 70, memory 175, and disk 180 in communication with each other. Network interface 175 may support communication of storage appliance 170 with one or more networks. Network interface 175 may include a wireless network interface and/or a wired network interface. Processor 175 may support storage appliance in execution of computer-readable instructions stored in memory 175 to perform operations described herein. Processor 170 may include one or more processing units, such as one or more central processing units (CPUs) and/or one or more graphics processing units (GPUs). Memory 175 may comprise one or more types of memory as described with respect to memory 150. Disk 180 may include a hard disk drive and/or a solid-state drive. Memory 175 and disk 180 may comprise hardware storage devices.

The storage appliance 135 or storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the networked computing environment 100 may include a virtualized infrastructure that provides software, data processing, and/or data storage services to end users accessing the services via the networked computing environment 100. In one example, networked computing environment 100 may provide cloud-based work productivity or business-related applications to a computing device, such as computing device 115. The storage appliance 110 may comprise a cloud-based data management system for backing up virtual machines and/or files within a virtualized infrastructure, such as virtual machines running on server 125 or files stored on server 125.

In some examples, networked computing environment 100 may provide remote access to secure applications and files stored within data center 105 from a remote computing device, such as computing device 115. The data center 105 may use an access control application to manage remote access to protected resources, such as protected applications, databases, or files located within the data center 105. To facilitate remote access to secure applications and files, a secure network connection may be established using a virtual private network (VPN). A VPN connection may allow a remote computing device, such as computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

In some examples, the storage appliance 135 or storage appliance 110 may manage the extraction and storage of virtual machine snapshots associated with different point in time versions of one or more virtual machines running within the data center 105. A snapshot of a virtual machine may correspond with a state of the virtual machine at a particular point-in-time. In response to a restore command from the storage device 130, the storage appliance 135 may restore a point-in-time version of a virtual machine or restore point-in-time versions of one or more files located on the virtual machine and transmit the restored data to the server 125. In response to a mount command from the server 125, the storage appliance 135 may allow a point-in-time version of a virtual machine to be mounted and allow the server 125 to read and/or modify data associated with the point-in-time version of the virtual machine. To improve storage density, the storage appliance 135 may deduplicate and compress data associated with different versions of a virtual machine and/or deduplicate and compress data associated with different virtual machines. To improve system performance, the storage appliance 135 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 135 or storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

As described herein, the storage appliance 135 may support virtual machine backup via snapshots and replication. To support virtual machine backup and replication, the storage appliance 135 may support a failover procedure service that is used to orchestrate the replication of a virtual machine environment at a new location (e.g., a target computing system such as another storage appliance 135, server 125, or data storage device 130). The procedure uses an agent executing on a source computing system (e.g., another storage appliance 135 or the server 125) to determine configurations and an agent on the target cluster to install various configurations. Because the agent is executing on the source machine that is snapshotted for virtual machine replication, the agent is installed in the target system. However, some administrators are hesitant to use agents due to the agents having root privileges. Further, only snapshots that had the agents enabled can be used for recovery on the target using the failover procedure service.

Techniques described herein may support an agentless virtual machine replication. The storage appliance 135 may be configured to receive configuration parameters (e.g., network configuration) associated with one or more virtual machines. During a failover procedure, the storage appliance 135 may be used to generate an executable package that includes instructions for installing the configuration parameters at the new virtual machine on the target computing system. Upon booting of a replicated virtual machine, the package may be executed to install the configurations and perform other customizations. The package may be generated based on the metadata associated with the source and configured to execute on an operating system of the virtual machine. This procedure functions to reduce the amount of time to perform the failover procedure. For example, an agent based failover may use two boots of the new virtual machine, while the agentless procedure may use one boot procedure.

It should be appreciated by a person skilled in the art that one or more aspects of the disclosure may be implemented in a computing environment 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
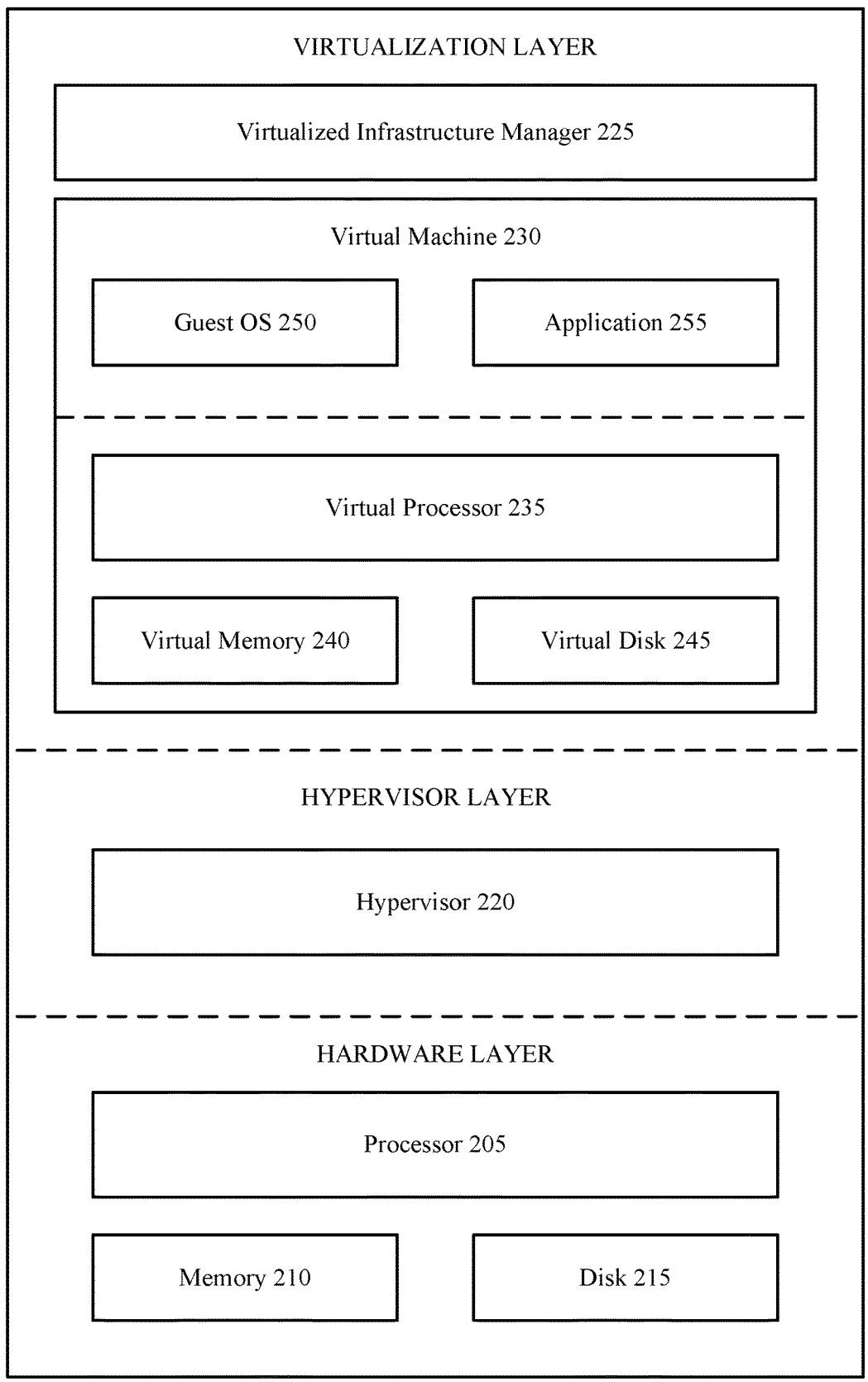
FIG. 2 illustrates an example of a server that supports techniques for package injection for virtual machine configuration in accordance with aspects of the present disclosure.

FIG. 2 illustrates an example of a server 200 that supports techniques for data retrieval using cryptographic signatures in accordance with aspects of the present disclosure. The server 200 may be an example of a server 125 described with reference to FIG. 1. The server 200 may include one server out of a plurality of servers that are networked together within a data center (e.g., data center 105 described with reference to FIG. 1). In one example, the plurality of servers may be positioned within one or more server racks within the data center. As depicted, the server 200 includes hardware-level components and software-level components. The hardware-level components include one or more processors 205, one or more memory 210, and one or more disks 215. The software-level components include a hypervisor 220, a virtualized infrastructure manager 225, and one or more virtual machines, such as virtual machine 230. The hypervisor 220 may include a native hypervisor or a hosted hypervisor. The hypervisor 220 may provide a virtual operating platform for running one or more virtual machines, such as virtual machine 230. Virtual machine 230 includes a plurality of virtual hardware devices including a virtual processor 235, a virtual memory 240, and a virtual disk 245. The virtual disk 245 may include a file stored within the one or more disks 245. In one example, a virtual machine 230 may include a plurality of virtual disks 245, with each virtual disk of the plurality of virtual disks 245 associated with a different file stored on the one or more disks 245. Virtual machine 230 may include a guest operating system 250 that runs one or more applications, such as application 255.

The virtualized infrastructure manager 225, which may be an example of the virtualization manager 160 described with reference to FIG. 1, may run on a virtual machine or natively on the server 200. The virtual machine may, for example, be or include the virtual machine 230 or a virtual machine separate from the server 200. Other arrangements are possible. The virtualized infrastructure manager 225 may provide a centralized platform for managing a virtualized infrastructure that includes a plurality of virtual machines. The virtualized infrastructure manager 225 may manage the provisioning of virtual machines running within the virtualized infrastructure and provide an interface to computing devices interacting with the virtualized infrastructure. The virtualized infrastructure manager 225 may perform various virtualized infrastructure related tasks, such as cloning virtual machines, creating new virtual machines, monitoring the state of virtual machines, and facilitating backups of virtual machines.

In an example, the server 200 may use the virtualized infrastructure manager 225 to facilitate backups for a plurality of virtual machines running on the server 200. One or more of the virtual machines running on the server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In an example, a data management application running on a storage appliance, such as storage appliance 110 in FIG. 1 or storage appliance 135 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 225 may set the virtual machine into a frozen state or store a copy of the virtual machine at the particular point in time. The virtualized infrastructure manager 225 may then transfer data associated with the virtual machine (e.g., an image of the virtual machine or a portion of the image of the virtual machine) to the storage appliance 110 or storage appliance 135. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 225 may transfer a full image of the virtual machine to the storage appliance 110 or storage appliance 135 of FIG. 1 or a plurality of data blocks corresponding with the full image (e.g., to enable a full image-level backup of the virtual machine to be stored on the storage appliance). In other cases, the virtualized infrastructure manager 225 may transfer a portion of an image of the virtual machine associated with data that has changed since an earlier point in time prior to the particular point in time or since a last snapshot of the virtual machine was taken. In one example, the virtualized infrastructure manager 225 may transfer data associated with virtual blocks stored on a virtual disk of the virtual machine that have changed since the last snapshot of the virtual machine was taken. In one example, the data management application may specify a first point in time and a second point in time and the virtualized infrastructure manager 225 may output one or more virtual data blocks associated with the virtual machine that have been modified between the first point in time and the second point in time.

In some examples, the server 200 or the hypervisor 220 may communicate with a storage appliance, such as storage appliance 110 in FIG. 1 or storage appliance 135 in FIG. 1, using a distributed file system protocol such as NFS Version 3, or Server Message Block (SMB) protocol. The distributed file system protocol may allow the server 200 or the hypervisor 220 to access, read, write, or modify files stored on the storage appliance as if the files were locally stored on the server 200. The distributed file system protocol may allow the server 200 or the hypervisor 220 to mount a directory or a portion of a file system located within the storage appliance.

As described herein, the server 200 and/or a storage appliance may support snapshot generation and replication for virtual machines 230. In some cases, the server 200 may support a cloud application that manages the virtual machines 230. To support agentless and efficient virtual machine replication, the cloud application may receive an indication of configuration parameters (e.g., network configuration parameters) from a first virtual machine. As part of the failover procedure, the cloud application may generate an executable package that is configured to be executable by a set of default drivers on a target computing system upon bootup of the new/replicated virtual machine 230. The executable package may be executed to configure the second virtual machine in accordance with the configuration parameters associated with the first virtual machine 230. The cloud application may transmit the executable package to the computing system supporting the second virtual machine such that the package is executed to configure the second virtual machine.

Figure 3:
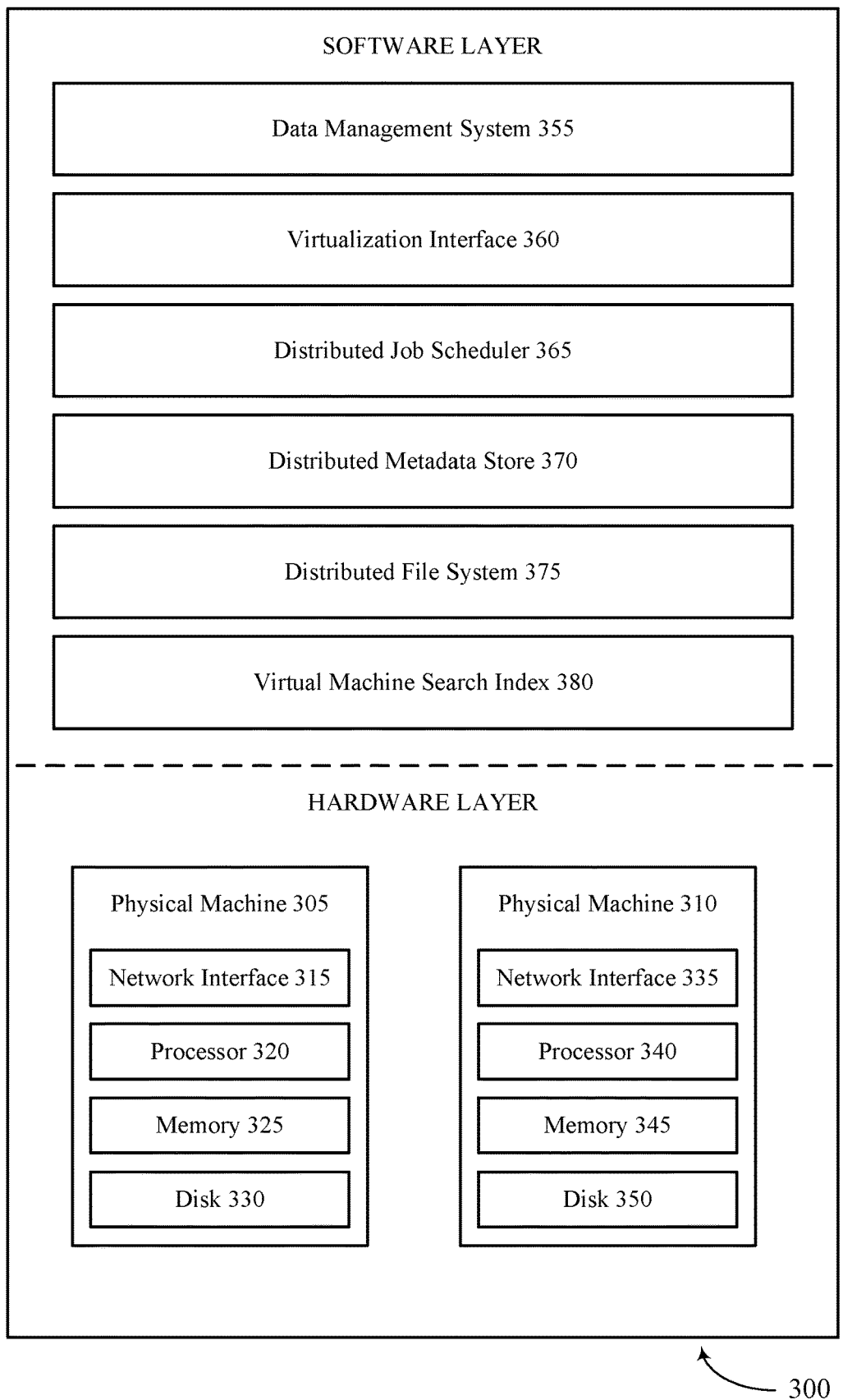
FIG. 3 illustrates an example of a storage appliance that supports techniques for package injection for virtual machine configuration in accordance with aspects of the present disclosure.

FIG. 3 illustrates an example of a storage appliance 300 that supports techniques for data retrieval using cryptographic signatures in accordance with aspects of the present disclosure. The storage appliance 300 may be an example of a storage appliance 110 or a storage appliance 135 as described with reference to FIG. 1. The storage appliance 300 may include a plurality of physical machines that may be grouped together and presented as a single computing system. One or more of the physical machines of the plurality of physical machines may comprise a node in a cluster. A cluster may be configured as a failover cluster for performing one or more failover operations as described herein. In one example, the storage appliance 300 may be positioned within a server rack within a data center, such as data center 105 as described with reference to FIG. 1. As depicted, the storage appliance 300 includes hardware-level components and software-level components. The hardware-level components include one or more physical machines, such as physical machine 305 and physical machine 310. The physical machine 305 includes a network interface 315, processor 320, memory 325, and disk 330 all in communication with each other. Processor 320 allows physical machine 305 to execute computer readable instructions stored in memory 325 to perform processes described herein. Disk 330 may include a hard disk drive and/or a solid-state drive. The physical machine 310 may include a network interface 335, processor 340, memory 345, and disk 350 all in communication with each other. Processor 340 allows physical machine 310 to execute computer readable instructions stored in memory 345 to perform processes described herein. Disk 350 may include a hard disk drive and/or a solid-state drive. In some examples, disk 350 may include a flash-based SSD or a hybrid HDD/SSD drive. In one example, the storage appliance 300 may include a plurality of physical machines arranged in a cluster. One or more of the plurality of physical machines may include a plurality of multi-core CPUs, RAM (e.g., 108 GB of RAM), SSD space (e.g., a 500 GB SSD), HDD space (e.g., four 4 TB HDDs), and a network interface controller.

In some examples, the plurality of physical machines may be used to implement a cluster-based network fileserver. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 125 in FIG. 1, or a hypervisor, such as hypervisor 220 in FIG. 2, to communicate with the storage appliance 135 or storage appliance 110 may not provide a failover mechanism (e.g., NFS Version 3). In the case that no failover mechanism is provided on the client side, the hypervisor may not be able to connect to a new node within a cluster in the event that the node connected to the hypervisor fails.

In some examples, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 220 in FIG. 2, may be configured with a first floating IP address associated with a first node in the cluster. The hypervisor may connect to the cluster using the first floating IP address. In one example, the hypervisor may communicate with the cluster using a distributed file system protocol (e.g., NFS Version 3 protocol). One or more nodes in the cluster may run a Virtual Router Redundancy Protocol (VRRP) daemon. A daemon may include a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node G may be G-i modulo N. In another example, given a number (N) of nodes in a cluster from node(0) to node(N−1), for a floating IP address (i), the VRRP priority of node G may be (i-j) modulo N. In these cases, node G will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some examples, a cluster may include a plurality of nodes and one or more nodes of the plurality of nodes may be assigned a different floating IP address. In such examples, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 3, the software-level components of the storage appliance 300 may include data management system 355, a virtualization interface 360, a distributed job scheduler 365, a distributed metadata store 370, a distributed file system 375, and one or more virtual machine search indexes, such as virtual machine search index 380. In one example, the software-level components of the storage appliance 300 may be run using a dedicated hardware-based appliance. Additionally or alternatively, the software-level components of the storage appliance 300 may be run from the cloud (e.g., the software-level components may be installed on a cloud service provider).

In some examples, the data storage across a plurality of nodes in a cluster may be aggregated and made available over a single file system namespace (e.g., /snapshots/). For example, the data storage available from the one or more physical machines (e.g., physical machine 305 and physical machine 310) may be made available of a single file system namespace. A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 375 may present itself as a single file system, so that as new physical machines or nodes are added to the storage appliance 300, the cluster may automatically discover the additional nodes and automatically increase the available capacity of the file system for storing files and other data. Each file stored in the distributed file system 375 may be partitioned into one or more chunks or shards. Each of the one or more chunks may be stored within the distributed file system 375 as a separate file. The files stored within the distributed file system 375 may be replicated or mirrored over a plurality of physical machines, thereby creating a load-balanced and fault tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 370 may include a distributed database management system that provides high availability without a single point of failure. In one example, the distributed metadata store 370 may comprise a database, such as a distributed document-oriented database. The distributed metadata store 370 may be used as a distributed key value storage system. In one example, the distributed metadata store 370 may include a distributed non-structured query language (NoSQL) key value store database. In some examples, the distributed metadata store 370 may include a partitioned row store, in which rows are organized into tables or other collections of related data held within a structured format within the key value store database. A table (or a set of tables) may be used to store metadata information associated with one or more files stored within the distributed file system 375. The metadata information may include the name of a file, a size of the file, file permissions associated with the file, when the file was last modified, and file mapping information associated with an identification of the location of the file stored within a cluster of physical machines. In one example, a new file corresponding with a snapshot of a virtual machine may be stored within the distributed file system 375 and metadata associated with the new file may be stored within the distributed metadata store 370. The distributed metadata store 370 may also be used to store a backup schedule for the virtual machine and a list of snapshots for the virtual machine that are stored using the storage appliance 300.

In some examples, the distributed metadata store 370 may be used to manage one or more versions of a virtual machine. Each version of the virtual machine may correspond with a full image snapshot of the virtual machine stored within the distributed file system 375 or an incremental snapshot of the virtual machine (e.g., a forward incremental or reverse incremental) stored within the distributed file system 375. In one example, the one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this example, a single full image needs to be stored and each version of the virtual machine may be generated from the single full image or the single full image combined with a subset of the one or more incremental aspects. Further, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 365 may be used for scheduling backup jobs that acquire and store virtual machine snapshots for one or more virtual machines over time. The distributed job scheduler 365 may follow a backup schedule to back up an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. A backup job may be associated with one or more tasks to be performed in a sequence. One or more tasks associated with a job may be run on a particular node within a cluster. In some cases, the distributed job scheduler 365 may schedule a specific job to be run on a particular node based on data stored on the particular node. For example, the distributed job scheduler 365 may schedule a virtual machine snapshot job to be run on a node in a cluster that is used to store snapshots of the virtual machine in order to reduce network congestion.

The distributed job scheduler 365 may comprise a distributed fault tolerant job scheduler, in which jobs affected by node failures are recovered and rescheduled to be run on available nodes. In one example, the distributed job scheduler 365 may be fully decentralized and implemented without the existence of a master node. The distributed job scheduler 365 may run job scheduling processes on each node in a cluster or on a plurality of nodes in the cluster. In one example, the distributed job scheduler 365 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 370. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 365 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one example, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 365 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 365 may ensure that each task of the series of tasks is executed based on the ordering of tasks. Tasks that do not have dependencies with each other may be executed in parallel.

In some examples, the distributed job scheduler 365 may schedule each task of a series of tasks to be performed on a specific node in a cluster. In other examples, the distributed job scheduler 365 may schedule a first task of the series of tasks to be performed on a first node in a cluster and a second task of the series of tasks to be performed on a second node in the cluster. In these examples, the first task may have to operate on a first set of data (e.g., a first file stored in a file system) stored on the first node and the second task may have to operate on a second set of data (e.g., metadata related to the first file that is stored in a database) stored on the second node. In some examples, one or more tasks associated with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 365 may assign one or more tasks associated with a job to be executed on a particular node in a cluster based on the location of data required to be accessed by the one or more tasks.

In one example, the distributed job scheduler 365 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 225 in FIG. 2, to create a frozen copy of the virtual machine and to transfer one or more chunks (or one or more files) associated with the frozen copy to a storage appliance, such as storage appliance 135 in FIG. 1. The one or more tasks may also include generating metadata for the one or more chunks, storing the metadata using the distributed metadata store 370, storing the one or more chunks within the distributed file system 375, and communicating with the virtualized infrastructure manager 225 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 375 (e.g., the first chunk is located at /snapshotsNM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 360 may provide an interface for communicating with a virtualized infrastructure manager managing a virtualization infrastructure, such as virtualized infrastructure manager 225 in FIG. 2, and requesting data associated with virtual machine snapshots from the virtualization infrastructure. The virtualization interface 360 may communicate with the virtualized infrastructure manager using an API for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 360 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance 300. However, if the snapshot of the virtual machine is not the first snapshot taken of the virtual machine, then the data blocks of the virtual machine that have changed since a prior snapshot was taken may be transferred to the storage appliance 300.

The virtual machine search index 380 may include a list of files that have been stored using a virtual machine and a version history for each of the files in the list. One or more version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 380 may be used to identify a version of the virtual machine that includes a particular version of a file (e.g., a particular version of a database, a spreadsheet, or a word processing document). In some cases, each of the virtual machines that are backed up or protected using storage appliance 300 may have a corresponding virtual machine search index.

In one example, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index (e.g., virtual machine search index 380) may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some examples, if a virtual machine includes a plurality of virtual disks, then a virtual machine search index may be generated for each virtual disk of the plurality of virtual disks. For example, a first virtual machine search index may catalog, and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 375 in FIG. 3.

The data management system 355 may comprise an application running on the storage appliance 300 that manages and stores one or more snapshots of a virtual machine. In one example, the data management system 355 may comprise a highest-level layer in an integrated software stack running on the storage appliance. The integrated software stack may include the data management system 355, the virtualization interface 360, the distributed job scheduler 365, the distributed metadata store 370, and the distributed file system 375.

In some examples, the integrated software stack may run on other computing devices, such as a server or computing device 115 in FIG. 1. The data management system 355 may use the virtualization interface 360, the distributed job scheduler 365, the distributed metadata store 370, and the distributed file system 375 to manage and store one or more snapshots of a virtual machine. One or more snapshots of the virtual machine may correspond with a point-in-time version of the virtual machine. The data management system 355 may generate and manage a list of versions for the virtual machine. One or more versions of the virtual machine may map to or reference one or more chunks and/or one or more files stored within the distributed file system 375. Combined together, the one or more chunks and/or the one or more files stored within the distributed file system 375 may comprise a full image of the version of the virtual machine.

As described herein, the storage appliance 300 or server 200 may support a cloud application that is used for virtual machine management and replication. In some cases, the storage appliance 300 may manage virtual machines that are supported by physical machines 305 and 310. The cloud application may receive configuration parameters associated with the virtual machines, and the configuration parameters may include network configurations for the virtual machines. During a failover procedure, a user may selectably indicate that a virtual machine is to be replicated. In response to the selection, the cloud application may generate an executable package that is executable by one or more default drivers of a virtual machine to install the configuration parameters in the replicated virtual machine. When the replicated virtual machine is booted, the default drivers may execute the package to configure the parameters at the virtual machine. This procedure may allow the virtual machine to be replicated without the use of agents and may support efficient computing and virtual machine replication. For example, using the package ingestion procedure may allow the virtual machine to be replicated using a single boot procedure, rather than using two or more boot procedures, as is the case when an agent is used.

Figure 4:
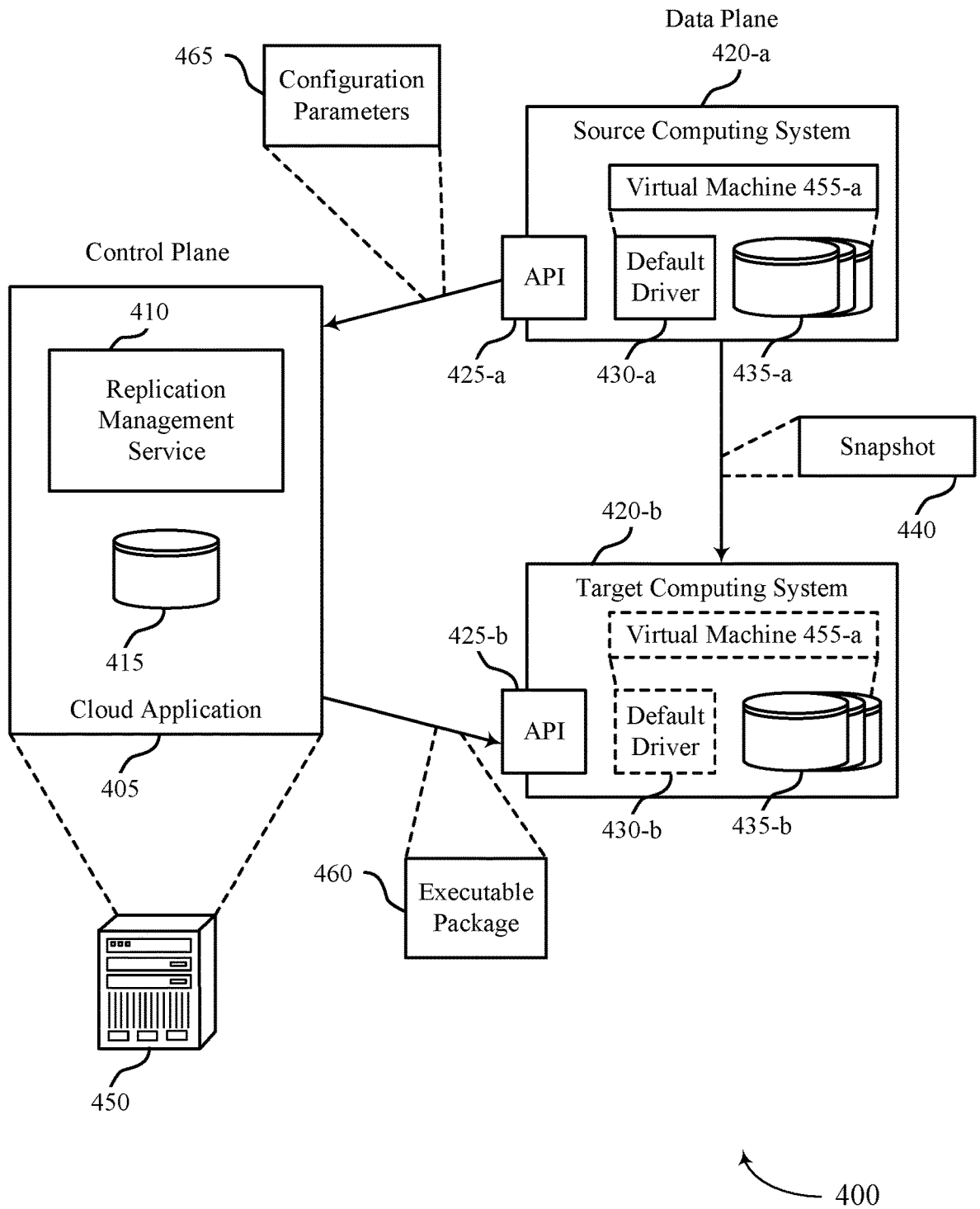
FIG. 4 illustrates an example of a computing environment that supports techniques for package injection for virtual machine configuration in accordance with aspects of the present disclosure.

FIG. 4 illustrates an example of a computing environment 400 that supports techniques for package injection for virtual machine configuration in accordance with aspects of the present disclosure. The computing environment 400 includes a server 450 and computing systems 420. The server 450 may be an example of the servers (e.g., server 125 and server 200) as described with respect to FIGS. 1 through 3, and the computing systems 420 may be examples of the storage appliances (e.g., storage appliance 135 and 300) described with respect to FIGS. 1 through 3.

The server 450 may represent a control plane of the computing environment 400, and the computing systems 420 may represent the data plane of the computing environment 400. As such, the server 450 may support a cloud application 405 that manages the architecture of the data plane and data backup and recovery. The cloud application 405 may be accessed by an administrator to configure, maintain, analyze, backup, and otherwise access various data systems, including the computing systems 420. The cloud application 405 may support a replication management service 410 that may be used to maintain backup snapshots and replicate virtual machines 455 executing on the computing systems 420.

The computing systems 420 may include a plurality of computing nodes 435 (e.g., a compute cluster) and may execute a virtual machine 455 that is used to direct reads/writes for data stored on the computing nodes 435 of the computing system 420. The cloud application 405 may direct various control messages to the computing system via an API 425 endpoint. Further, the virtual machine 455-*a* may use a default driver 430. The default driver 430 may represent a set of services and components that support management of the virtual machines 455. In one example, the default driver corresponds to a VMware Tools. The default driver 430 may be configured to access a shared location upon boot of the virtual machine and execute any executables that are located in the shared location.

As part of the data backup and replication procedure, the source computing system 420-*a* may be configured to periodically take snapshots of the virtual machine 455-*a* executing on the source computing system 420-*a*. As described herein, the snapshot of the virtual machine 455-*a* may represent the state of the virtual machine, including various configurations, data locations, topology, etc. The snapshots may be stored in one or more of the plurality of computing nodes of the source computing system 420-*a*, in another computing system, or both.

As described herein, in some cases, an agent may be configured at the virtual machine 450-*a*. The agent may be a program that is always or continuously executing. The agent may be configured as part of a replication process to identify various configuration parameters, such as network configuration parameters. For example, the agent may be configured to periodically poll for configuration parameters and install the corresponding configurations of the virtual machine 455. When an agent is part of a virtual machine 455, and a snapshot is taken of the virtual machine 455, the agent is to be installed on a virtual machine 455-*b* of a target computing system 420-*b*. Additionally, in some cases, a snapshot of a virtual machine 455-*a* that does not have an agent executing may not be usable for replication due to the inability to configure the parameters without the agent. However, agents may be configured with root privileges, and as such, may produce security vulnerabilities.

Techniques described herein support virtual machine snapshot and replication without agents, and thereby improve security during replication and virtual machine execution. Further, using the techniques described herein, the replication process may be more computing resource efficient due to reduced virtual machine boot requirements. To support agentless replication, the control application may receive, from the source virtual machine 455-*a* (e.g., via the API 425-*a* of the source computing system 420-*a*) an indication of configuration parameters 465 of the source virtual machine 455-*a*. These configuration parameters 465 may be received one time, periodically, or on some other configured schedule. The configuration parameters 465 may be network configuration parameters, metadata associated with the virtual machine (e.g., operating systems of the virtual machine 455-*a*), or some other configuration parameters. Example network configuration parameters include IP addresses, network interface controller (NIC) configurations, or both. The configuration parameters 465 may indicate operating system type of the operating system of the virtual machine 455-*a*, such as Linux, Ubuntu, CentOS, Solaris, among others. The configuration parameters 465 may also indicate the operating system version of the virtual machine 455-*a* as well as the name of the virtual machine.

The replication management service 410 of the cloud application 405 may maintain a mapping of virtual machines 455-*a* and configuration parameters 465 received from the respective virtual machines 455. For example, the configuration parameters and virtual machine mappings may be maintained in a datastore 415 accessible by the cloud application 405. These mappings may be used for virtual machine 455 replication for failover recovery. In some examples, the mappings may include metadata associated with the virtual machines 455, such as the operating system type, which may be received as part of the configuration parameters 465.

For example, an administrator may access the replication management service 410 of the cloud application 405 to monitor virtual machine 455 functionality. When a virtual machine 455 fails, is not functioning correctly, the source computing system 420 fails, etc., the administrator may trigger the failover recovery procedure of the replication management service 410. For example, the administrator may select one or more source virtual machines 455 for which to initiate failover recovery. Further, the administrator may select one or more target computing systems (e.g., target computing system 420-*b*) at which the source virtual machines are to be recovered or replicated. The failover recovery procedure may include operations, including data preparation, data ingestion, virtual machine provisioning, etc. For example, the data ingestion procedure may include replicating the data of the computing nodes 435-*a* of the first virtual machine 455-*a* to the computing nodes 435-*b* of the second virtual machine 455-*b*.

To provision the replicated virtual machine 455-*a* on the target computing system 420 as part of the failover recovery procedure described herein, the replication management service 410 may generate an executable package that is executable by a second virtual machine 255-*b* that is replicated from a snapshot 440 of a first virtual machine 455-*a*. For example, the administrator may select the snapshot 440 and the snapshot may be transmitted to the target computing system 420-b for replication of the virtual machine 455. Further, upon initiation of the replication procedure at the cloud application 405, the cloud application 405 may generate an executable package 460 based on the metadata associated with the virtual machine 455 such that the executable package is configured to be executed by the set of default drivers 430-b on the second virtual machine 455-a upon bootup of the second virtual machine to configure the second virtual machine 455-a according to the configuration parameters 465 of the first virtual machine 455-a. In some examples, the executable package 460 may be generated based on the first virtual machine 455-a being configured with the default driver 430-a. That is, without the default driver being configured, the package ingestion technique described herein may not be operable.

The executable package 460 may be generated to be executable by the operating system of the virtual machines 455. That is, the format, instructions, etc. of the executable package may be dependent on (e.g., compatible with) the operating system that is to execute the package. Additionally, the executable package 460 may be transmitted to the target computing system 420-b via the API 425-b of the target computing system via an API request. The executable package 460 may be stored in a shared location associated with the default driver 430-b such that when the virtual machine 455-a is booted, the default driver identifies and executes the executable package 460.

In some examples, the cloud application 405 may support a user interface that is configured to receive user defined scripts that are inserted into the executable package 460. A user may enter the script directly into a field of the UI, may select preconfigured scripts for insertion, etc. The scripts may be used for various purposes, such as logging successful execution of the package 460 for configuration of the virtual machine 455-a.

The executable package injection technique may be used for other purposes outside of the failover procedure. For example, the executable package may be generated such as to install updates to the virtual machine. As such, the update procedure may be included in the executable package and transmitted to a virtual machine 455. The virtual machine may be rebooted such as to access the shared location including the executable package such that the updates are installed.

Figure 5:
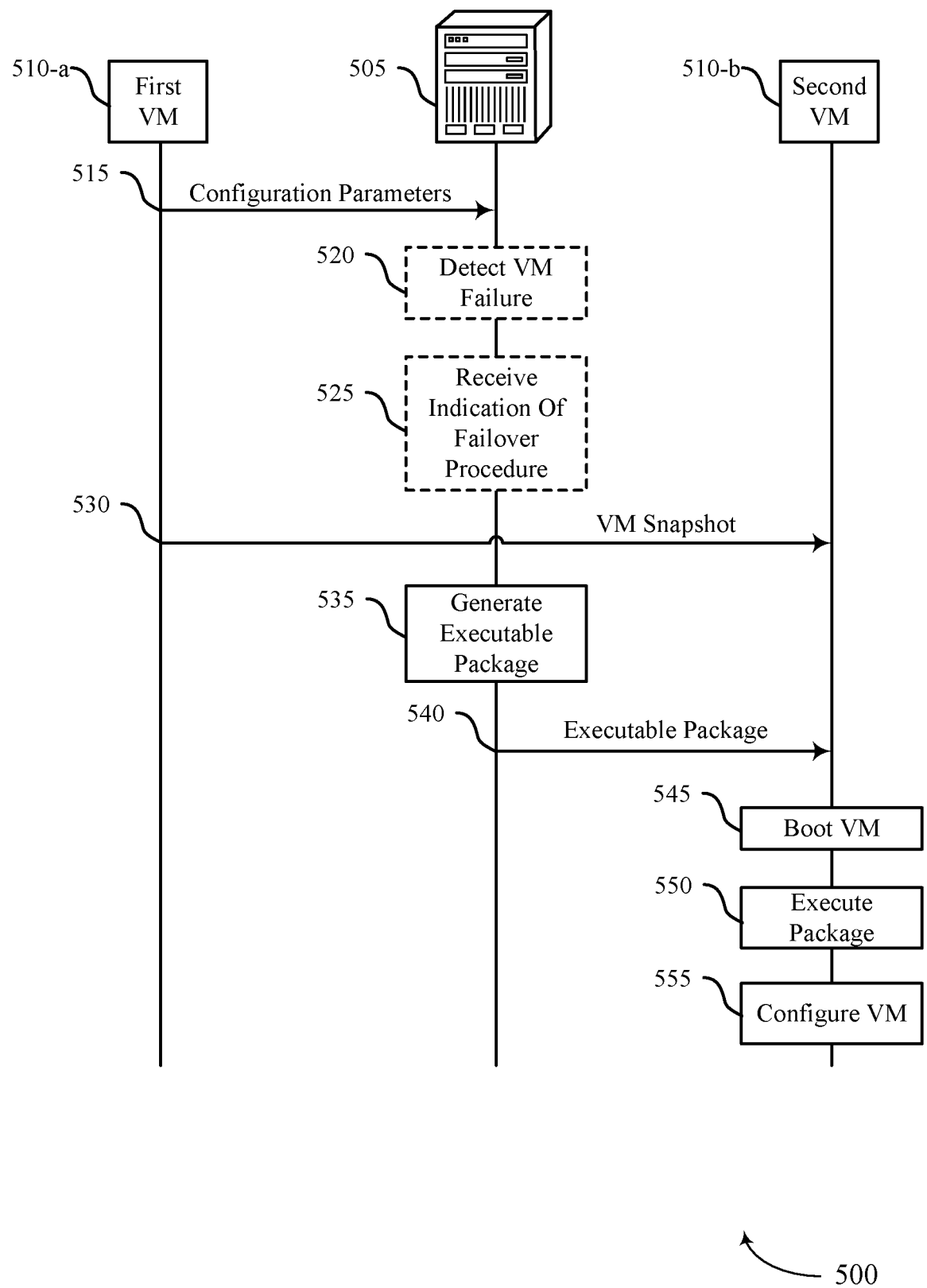
FIG. 5 illustrates an example of a process flow that supports techniques for package injection for virtual machine configuration in accordance with aspects of the present disclosure.

FIG. 5 illustrates an example of a process flow 500 that supports techniques for package injection for virtual machine configuration in accordance with aspects of the present disclosure. The process flow 500 includes a server 505, a first virtual machine 510-a, and a second virtual machine 510-b, which may be examples of the corresponding devices described with respect to FIGS. 1 through 4. The server 505 may support a cloud application, as described herein. The first virtual machine 510-a may be supported by a computing system (e.g., a storage appliance) as described with respect to FIGS. 1 through 4. The first virtual machine 510-a may be an example of a source virtual machine executing a source computing system. The second virtual machine 510-b may be an example of a target virtual machine that is to be executed on a target computing system. As the second virtual machine 510-b may be a replication of the first virtual machine 510-a, the second virtual machine may not yet be executing until further operations are performed according to the process flow 500.

In some examples, the operations illustrated in the process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 515, the cloud application configured for managing a plurality of virtual machines and executing on the server 505 may receive, from a first virtual machine, an indication of one or more configuration parameters associated with the first virtual machine. The configuration parameters may include network configuration parameters (e.g., IP addresses, NIC configurations) and/or operating system type indications. The indication of the configuration parameters may be transmitted periodically, one time, or according to some configured schedule.

At 520, the cloud application at the server 505 may detect failure of the first virtual machine. The failure may be detected based on errors received, based on monitored metrics, etc.

At 525, the cloud application at the server 505 may receive an indication of initiation of a failover procedure to recover the first virtual machine 510-a as the second virtual machine 510-b. For example, an administrator may access a user interface of the cloud application to initiate the failover procedure. The administrator may select the virtual machines that are to be replicated (e.g., the first virtual machine 510-a), and a target computing system to execute the replicated virtual machine (e.g., the second virtual machine 510-b), among other parameters.

At 530, a virtual machine snapshot of the first virtual machine 510-a may be replicated to a computing system that is to support the second virtual machine 510-b. The virtual machine snapshot may be replicated in response to receipt of indication of the initiation of the failover procedure.

At 535, the cloud application of the server 505 may generate an executable package based on metadata associated with the first virtual machine. The executable package may be configured to be executable by a set of default drivers on the second virtual machine 510-b upon bootup of the second virtual machine to configure the second virtual machine 510-b in accordance with the one or more configuration parameters. In some examples, the executable package may be generated to be executable by the operating system of the first virtual machine 510-a and the second virtual machine 510-b.

To generate the package, the cloud application may create a directory with the contents of the script to reconfigure corresponding to the operating system of the virtual machine. The clod application may create a parameter corresponding to the script input from an API. The cloud application may create a parent script that calls the operating script with the parameter. Additional postscripts may be bundles. The package may be created with a package header and a cab file with the contents described above.

At 540, the cloud application of the server 505, may transmit the to the second virtual machine 510-b, the executable package for configuring the second virtual machine in accordance with the one or more configuration parameters. In some cases, transmitting the executable package may include transmitting an (API) request to the second virtual machine. The executable package may be transmitted to be stored in a shared location of the computing system supporting the second virtual machine and accessible by the set of default drivers.

At 545, the target computing system may boot the second virtual machine 510-b based on the virtual machine snapshot. At 550, in response to booting the virtual machine, the executable package may be executed. For example, the default drivers may be configured to automatically access the shared location including the executable package and execute executables in the shared location. At 555, the second virtual machine 510-*b* may be configured according to the executable package. In some cases, executing the executable package includes executing instructions to configure the second virtual machine 510-*b* according to the configuration parameters. Further, executing the executable package may include executing the scripts input in the user interface supported by the cloud application.

From the target computing system perspective, the target computing system may be configured to query the virtual machine datastore path and transfer the deployment package (e.g., executable package) to the location of the datastore path. The target computing system may configure a guest virtual machine and customizations. The target computing system may power on the virtual machine which triggers execution of the deployment/executable package by the default driver in the virtual machine space. The target computing system may then query the states of the virtual machine and return the configured information back to the cloud application.

Figure 6:
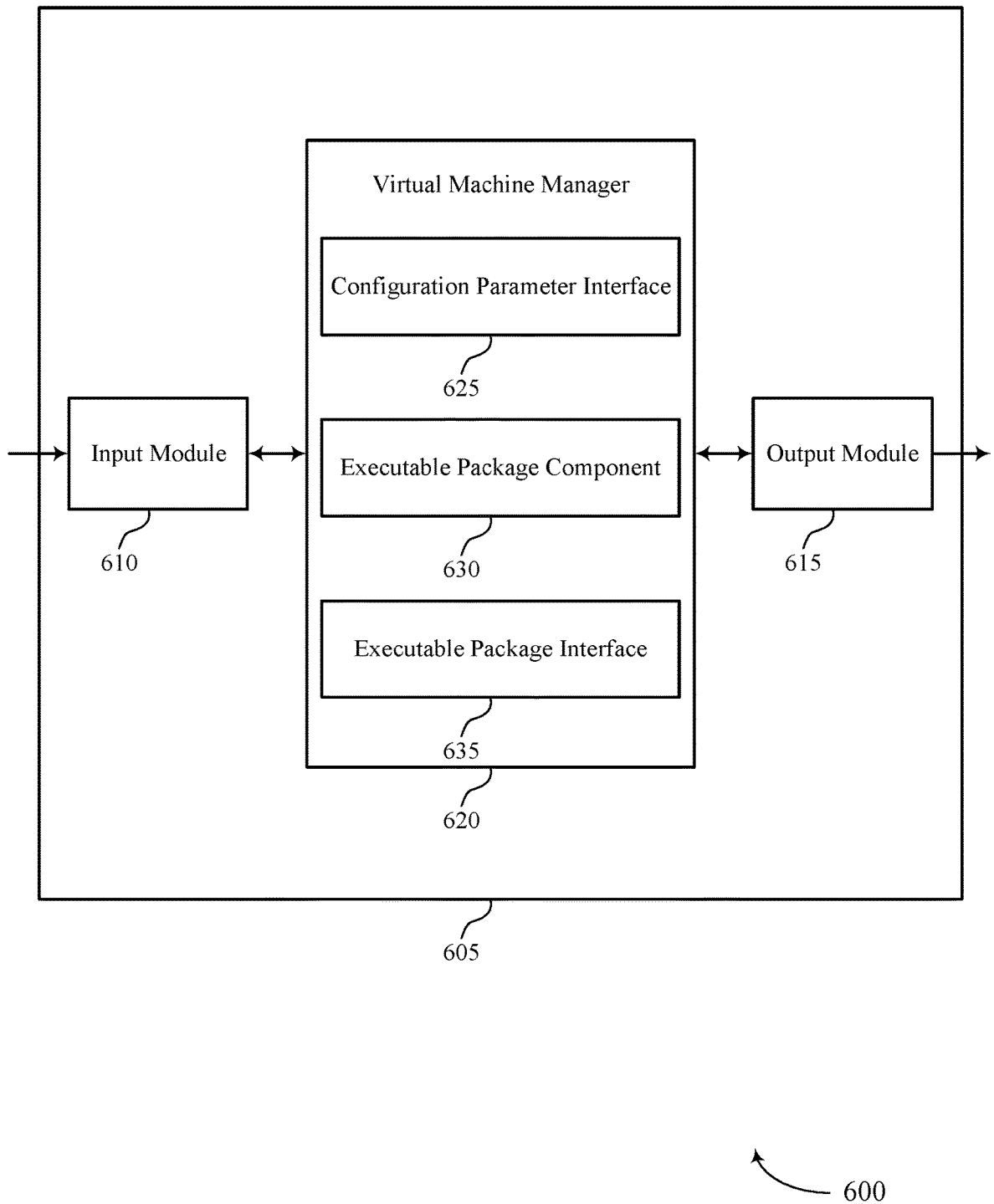
FIG. 6 shows a block diagram of an apparatus that supports techniques for package injection for virtual machine configuration in accordance with aspects of the present disclosure.

FIG. 6 shows a block diagram 600 of a device 605 that supports techniques for package injection for virtual machine configuration in accordance with aspects of the present disclosure. The device 605 may include an input module 610, an output module 615, and a virtual machine manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the virtual machine manager 620 to support techniques for package injection for virtual machine configuration. In some cases, the input module 610 may be a component of a network interface 810 as described with reference to FIG. 8.

The output module 615 may manage output signals for the device 605. For example, the output module 615 may receive signals from other components of the device 605, such as the virtual machine manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of a network interface 810 as described with reference to FIG. 8.

For example, the virtual machine manager 620 may include a configuration parameter interface 625, an executable package component 630, an executable package interface 635, or any combination thereof. In some examples, the virtual machine manager 620, or various components thereof, may be configured to perform various operations (e.g., receiving, monitoring, transmitting) using or otherwise in cooperation with the input module 610, the output module 615, or both. For example, the virtual machine manager 620 may receive information from the input module 610, send information to the output module 615, or be integrated in combination with the input module 610, the output module 615, or both to receive information, transmit information, or perform various other operations as described herein.

The virtual machine manager 620 may support managing a virtual machine environment in accordance with examples as disclosed herein. The configuration parameter interface 625 may be configured as or otherwise support a means for receiving, at a cloud application configured for managing a plurality of virtual machines and from a first virtual machine, an indication of one or more configuration parameters associated with the first virtual machine. The executable package component 630 may be configured as or otherwise support a means for generating, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters. The executable package interface 635 may be configured as or otherwise support a means for transmitting, to the second virtual machine, the executable package for configuring the second virtual machine in accordance with the one or more configuration parameters.

Figure 7:
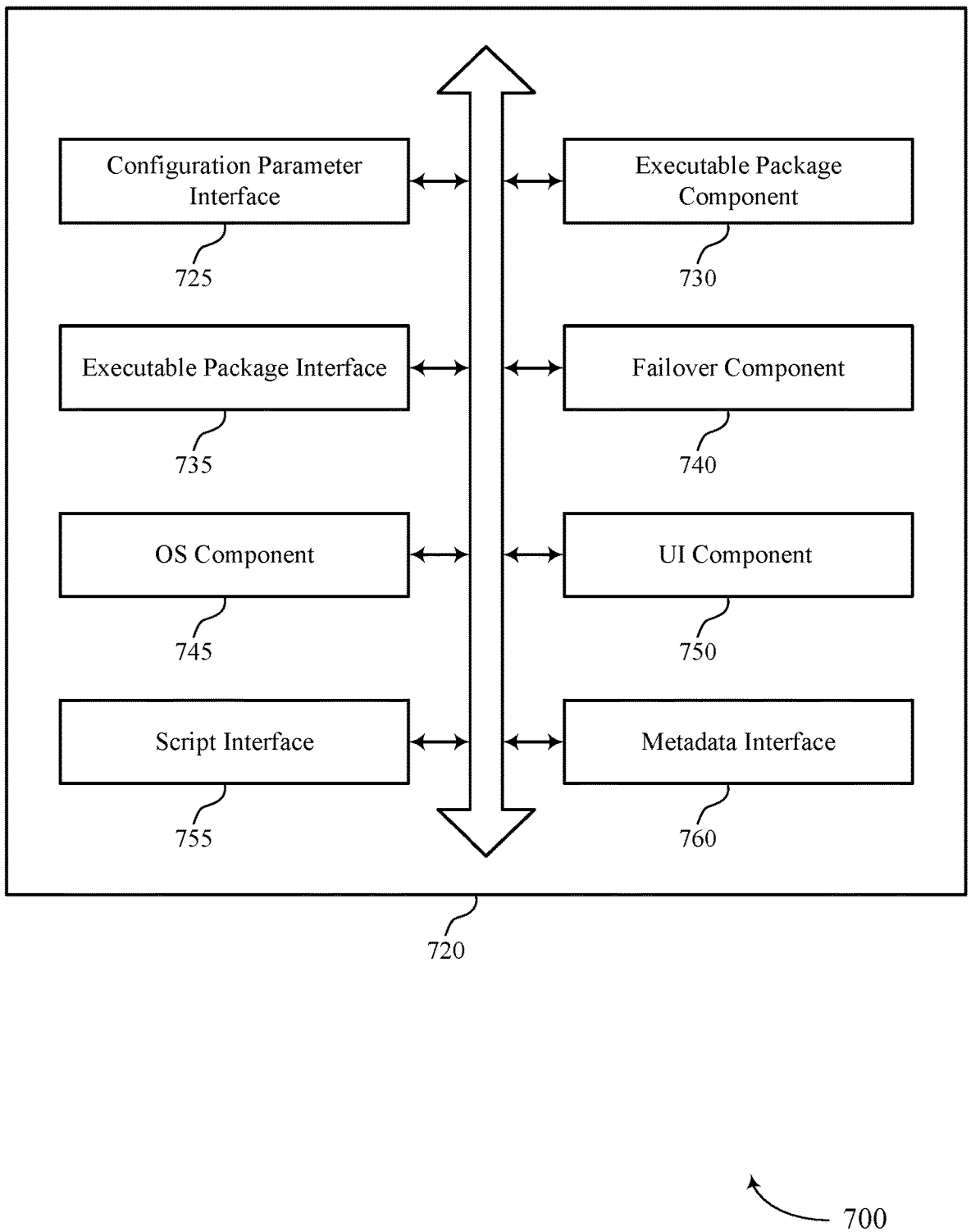
FIG. 7 shows a block diagram of a virtual machine manager that supports techniques for package injection for virtual machine configuration in accordance with aspects of the present disclosure.

FIG. 7 shows a block diagram 700 of a virtual machine manager 720 that supports techniques for package injection for virtual machine configuration in accordance with aspects of the present disclosure. The virtual machine manager 720 may be an example of aspects of a virtual machine manager 620 as described herein. The virtual machine manager 720 may be a service supported by a cloud application or replication management service described herein. The virtual machine manager 720, or various components thereof, may be an example of means for performing various aspects of techniques for package injection for virtual machine configuration as described herein. For example, the virtual machine manager 720 may include a configuration parameter interface 725, an executable package component 730, an executable package interface 735, a failover component 740, an operating system (OS) component 745, a UI component 750, a script interface 755, a metadata interface 760, or any combination thereof. Each of these components may communicate, directly or indirectly, with one another (e.g., via one or more buses).

The virtual machine manager 720 may support managing a virtual machine environment in accordance with examples as disclosed herein. The configuration parameter interface 725 may be configured as or otherwise support a means for receiving, at a cloud application configured for managing a plurality of virtual machines and from a first virtual machine, an indication of one or more configuration parameters associated with the first virtual machine. The executable package component 730 may be configured as or otherwise support a means for generating, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters. The executable package interface 735 may be configured as or otherwise support a means for transmitting, to the second virtual machine, the executable package for configuring the second virtual machine in accordance with the one or more configuration parameters.

In some examples, the failover component 740 may be configured as or otherwise support a means for determining that the first virtual machine is subject to a failover procedure, wherein the executable package is generated and transmitted to the second virtual machine based at least in part on determining that the first virtual machine is subject to the failover procedure.

In some examples, the failover component 740 may be configured as or otherwise support a means for determining that a backup snapshot for the first virtual machine includes an indication that an instance of the set of default drivers is configured at the first virtual machine, wherein the executable package is generated based at least in part on the instance of the set of default drivers being configured at the first virtual machine.

In some examples, at least the backup snapshot for the first virtual machine is replicated onto the second virtual machine by the set of default drivers on the second virtual machine and based at least in part on the executable package.

In some examples, to support receiving the indication of one or more configuration parameters, the configuration parameter interface 725 may be configured as or otherwise support a means for receiving an indication of one or more network configurations for the first virtual machine, wherein the executable package is generated to configure the one or more network configurations at the second virtual machine.

In some examples, the one or more network configurations comprise one or more internet protocol addresses, a network interface control configuration, or a combination thereof.

In some examples, to support transmitting the executable package, the executable package interface 735 may be configured as or otherwise support a means for transmitting, to an API endpoint associated with a computing cluster supporting the second virtual machine, an API request that includes an indication of the executable package.

In some examples, the executable package is input to a shared location associated with the set of default drivers for execution based at least in part on the API request.

In some examples, to support generating the executable package, the OS component 745 may be configured as or otherwise support a means for identifying an operating system executed by the first virtual machine. In some examples, to support generating the executable package, the executable package component 730 may be configured as or otherwise support a means for generating the executable package that is compatible with the operating system.

In some examples, the UI component 750 may be configured as or otherwise support a means for receiving, at a user interface supported by the cloud application, an input indicative of a request to generate the executable package, wherein the executable package is generated based in part on receiving the input.

In some examples, the script interface 755 may be configured as or otherwise support a means for receiving, at a user interface supported by the cloud application, an input that is indicative of a script, wherein the executable package is generated to include the script that is to be executable by the second virtual machine.

In some examples, the metadata interface 760 may be configured as or otherwise support a means for receiving, from the first virtual machine, an indication of the metadata associated with the first virtual machine.

In some examples, the metadata comprises a name associated with the first virtual machine, a type of the first virtual machine, an operating system version executed by the first virtual machine, an operating system type executed by the first virtual machine, or a combination thereof.

Figure 8:
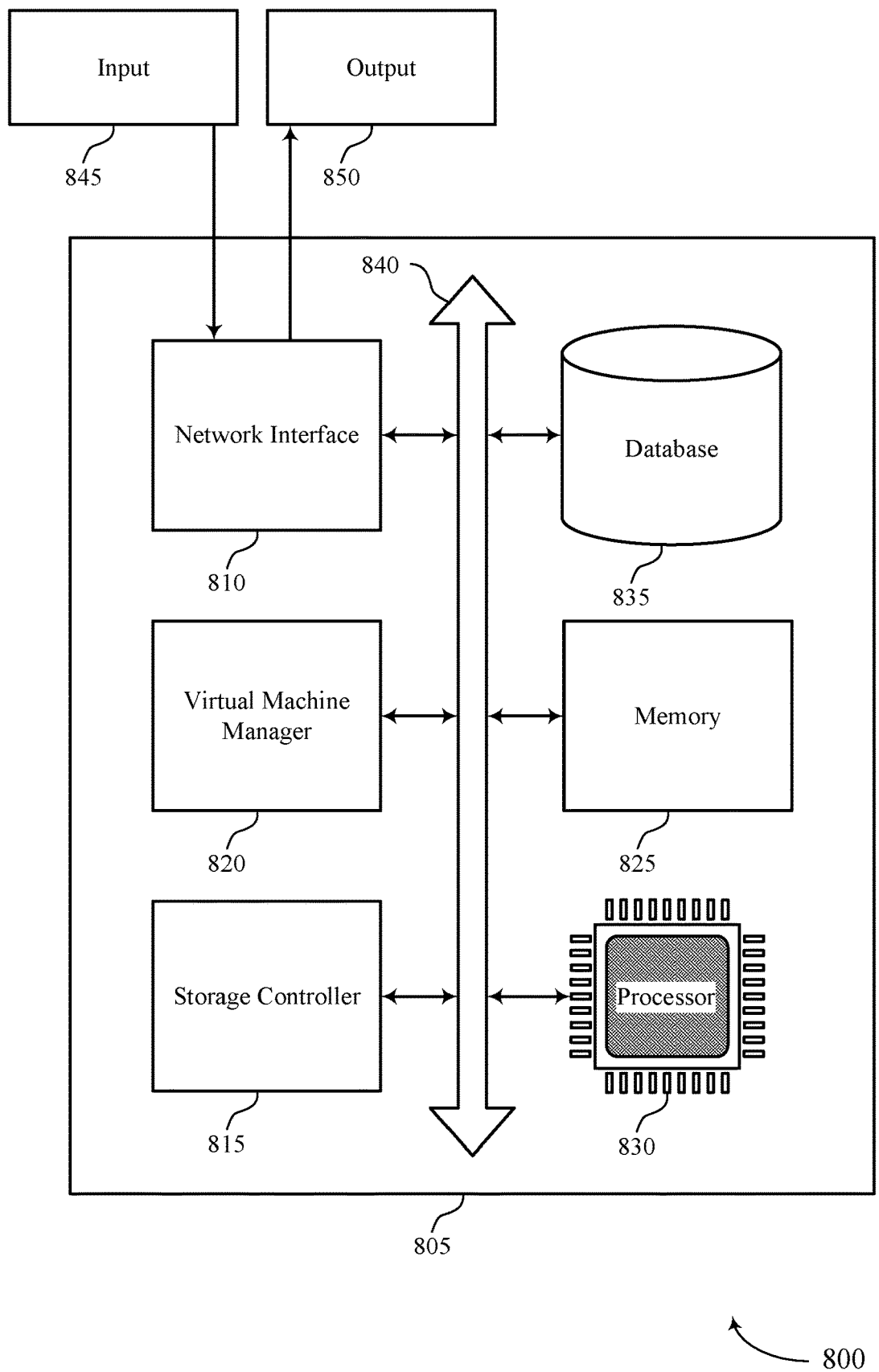
FIG. 8 shows a diagram of a system including a device that supports techniques for package injection for virtual machine configuration in accordance with aspects of the present disclosure.

FIG. 8 shows a diagram of a system 800 including a device 805 that supports techniques for package injection for virtual machine configuration in accordance with aspects of the present disclosure. The device 805 may be an example of or include the components of a device 605 as described herein. The device 805 may include components for bi-directional data communications, data management, and virtual machine replication, including components for transmitting and receiving communications, such as a virtual machine manager 820, a network interface 810, a storage controller 815, a memory 825, a processor 830, and a database 835. These components may be in electronic communication or otherwise coupled (e.g., operatively, communicatively, functionally, electronically, electrically) via one or more buses (e.g., a bus 840).

The network interface 810 may manage input signals 845 and output signals 850 for the device 805. The network interface 810 may also manage peripherals not integrated into the device 805. In some cases, the network interface 810 may represent a physical connection or port to an external peripheral. In some cases, the network interface 810 may utilize an operating system such as iOS®, ANDROID®, MS-DOS®, MS-WINDOWS®, OS/2®, UNIX®, LINUX®, or another known operating system. In other cases, the network interface 810 may represent or interact with a modem, a keyboard, a mouse, a touchscreen, or a similar device. In some cases, the network interface 810 may be implemented as part of a processor 830. In some examples, a user may interact with the device 805 via the network interface 810 or via hardware components controlled by the network interface 810.

The storage controller 815 may manage data storage and processing in a database 835. In some cases, a user may interact with the storage controller 815. In other cases, the storage controller 815 may operate automatically without user interaction. The database 835 may be an example of a single database, a distributed database, multiple distributed databases, a data store, a data lake, or an emergency backup database.

Memory 825 may include RAM, ROM, or any other memory type as described with reference to FIGS. 1-3. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting techniques for package injection for virtual machine configuration).

The virtual machine manager 820 may support managing a virtual machine environment in accordance with examples as disclosed herein. For example, the virtual machine manager 820 may be configured as or otherwise support a means for receiving, at a cloud application configured for managing a plurality of virtual machines and from a first virtual machine, an indication of one or more configuration parameters associated with the first virtual machine. The virtual machine manager 820 may be configured as or otherwise support a means for generating, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters. The virtual machine manager 820 may be configured as or otherwise support a means for transmitting, to the second virtual machine, the executable package for configuring the second virtual machine in accordance with the one or more configuration parameters.

Figure 9:
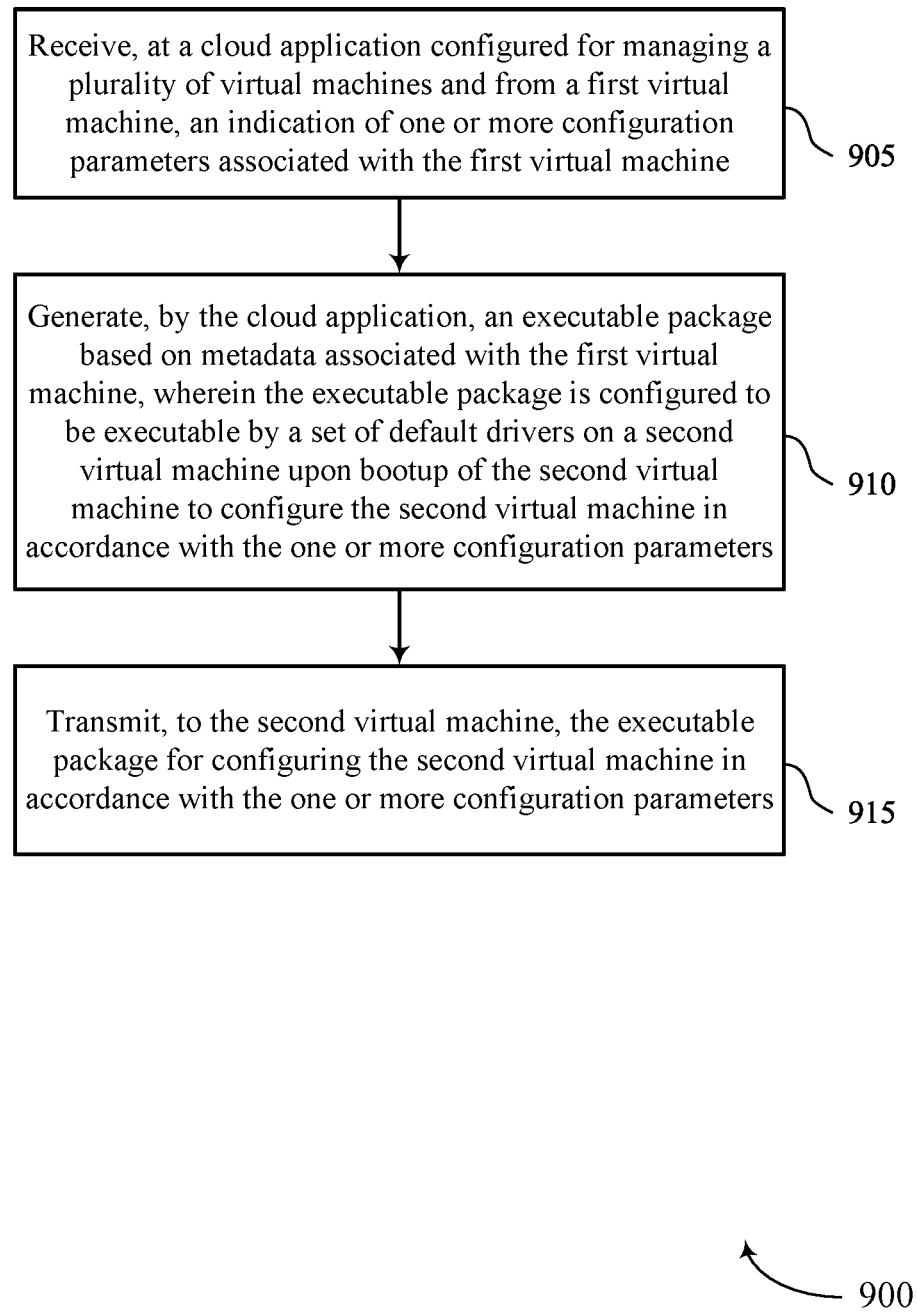
FIGS. 9 through 12 show flowcharts illustrating methods that support techniques for package injection for virtual machine configuration in accordance with aspects of the present disclosure.

FIG. 9 shows a flowchart illustrating a method 900 that supports techniques for package injection for virtual machine configuration in accordance with aspects of the present disclosure. The operations of the method 900 may be implemented by a server or its components as described herein. For example, the operations of the method 900 may be performed by a server as described with reference to FIGS. 1 through 8. In some examples, a server may execute a set of instructions to control the functional elements of the server to perform the described functions. Additionally or alternatively, the server may perform aspects of the described functions using special-purpose hardware.

At 905, the method may include receiving, at a cloud application configured for managing a plurality of virtual machines and from a first virtual machine, an indication of one or more configuration parameters associated with the first virtual machine. The operations of 905 may be performed in accordance with examples as disclosed herein. In some examples, aspects of the operations of 905 may be performed by a configuration parameter interface 725 as described with reference to FIG. 7.

At 910, the method may include generating, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters. The operations of 910 may be performed in accordance with examples as disclosed herein. In some examples, aspects of the operations of 910 may be performed by an executable package component 730 as described with reference to FIG. 7.

At 915, the method may include transmitting, to the second virtual machine, the executable package for configuring the second virtual machine in accordance with the one or more configuration parameters. The operations of 915 may be performed in accordance with examples as disclosed herein. In some examples, aspects of the operations of 915 may be performed by an executable package interface 735 as described with reference to FIG. 7.

Figure 10:
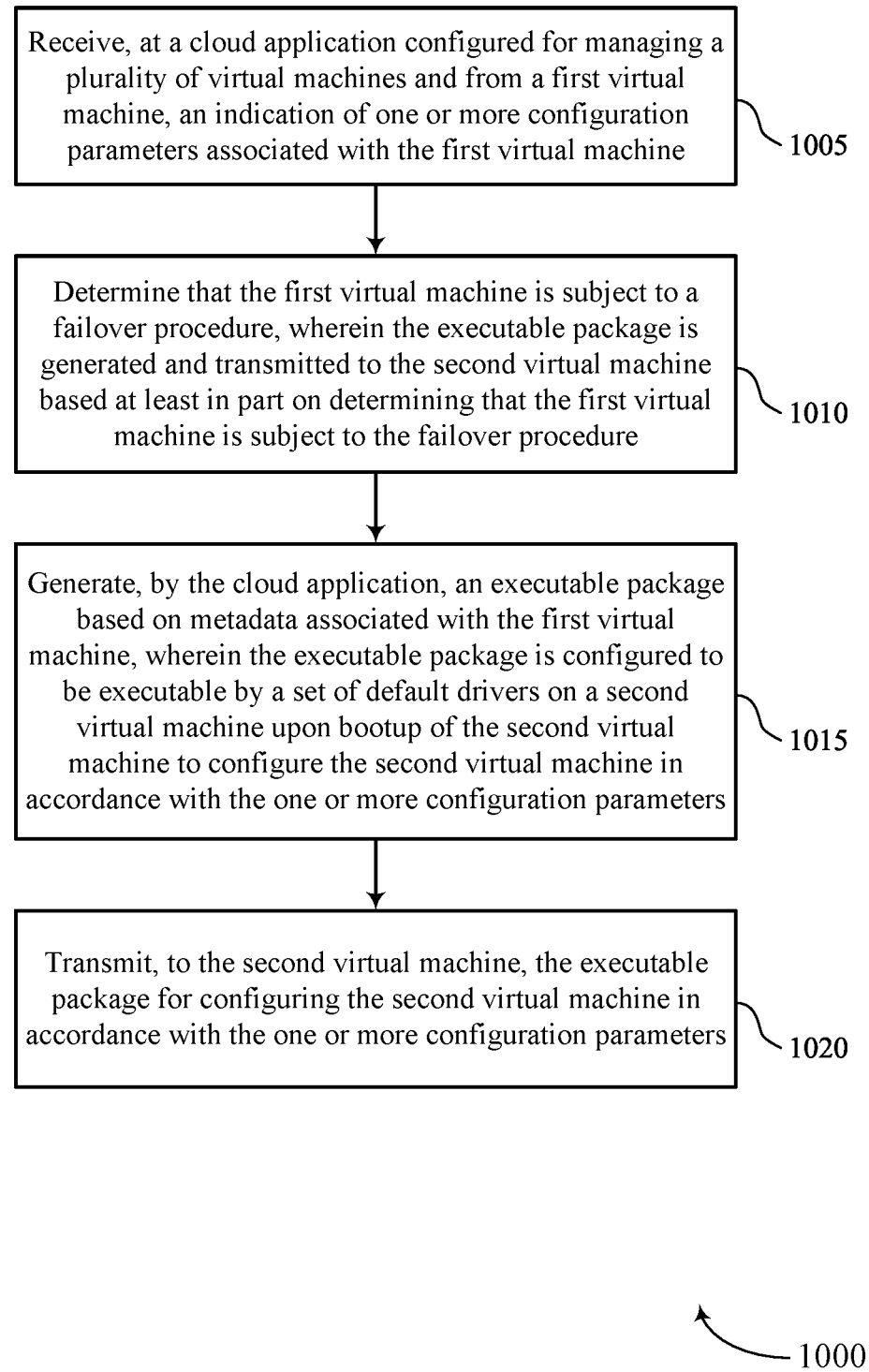

FIG. 10 shows a flowchart illustrating a method 1000 that supports techniques for package injection for virtual machine configuration in accordance with aspects of the present disclosure. The operations of the method 1000 may be implemented by a server or its components as described herein. For example, the operations of the method 1000 may be performed by a server as described with reference to FIGS. 1 through 8. In some examples, a server may execute a set of instructions to control the functional elements of the server to perform the described functions. Additionally or alternatively, the server may perform aspects of the described functions using special-purpose hardware.

At 1005, the method may include receiving, at a cloud application configured for managing a plurality of virtual machines and from a first virtual machine, an indication of one or more configuration parameters associated with the first virtual machine. The operations of 1005 may be performed in accordance with examples as disclosed herein. In some examples, aspects of the operations of 1005 may be performed by a configuration parameter interface 725 as described with reference to FIG. 7.

At 1010, the method may include determining that the first virtual machine is subject to a failover procedure, wherein the executable package is generated and transmitted to the second virtual machine based at least in part on determining that the first virtual machine is subject to the failover procedure. The operations of 1010 may be performed in accordance with examples as disclosed herein. In some examples, aspects of the operations of 1010 may be performed by a failover component 740 as described with reference to FIG. 7.

At 1015, the method may include generating, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters. The operations of 1015 may be performed in accordance with examples as disclosed herein. In some examples, aspects of the operations of 1015 may be performed by an executable package component 730 as described with reference to FIG. 7.

At 1020, the method may include transmitting, to the second virtual machine, the executable package for configuring the second virtual machine in accordance with the one or more configuration parameters. The operations of 1020 may be performed in accordance with examples as disclosed herein. In some examples, aspects of the operations of 1020 may be performed by an executable package interface 735 as described with reference to FIG. 7.

Figure 11:
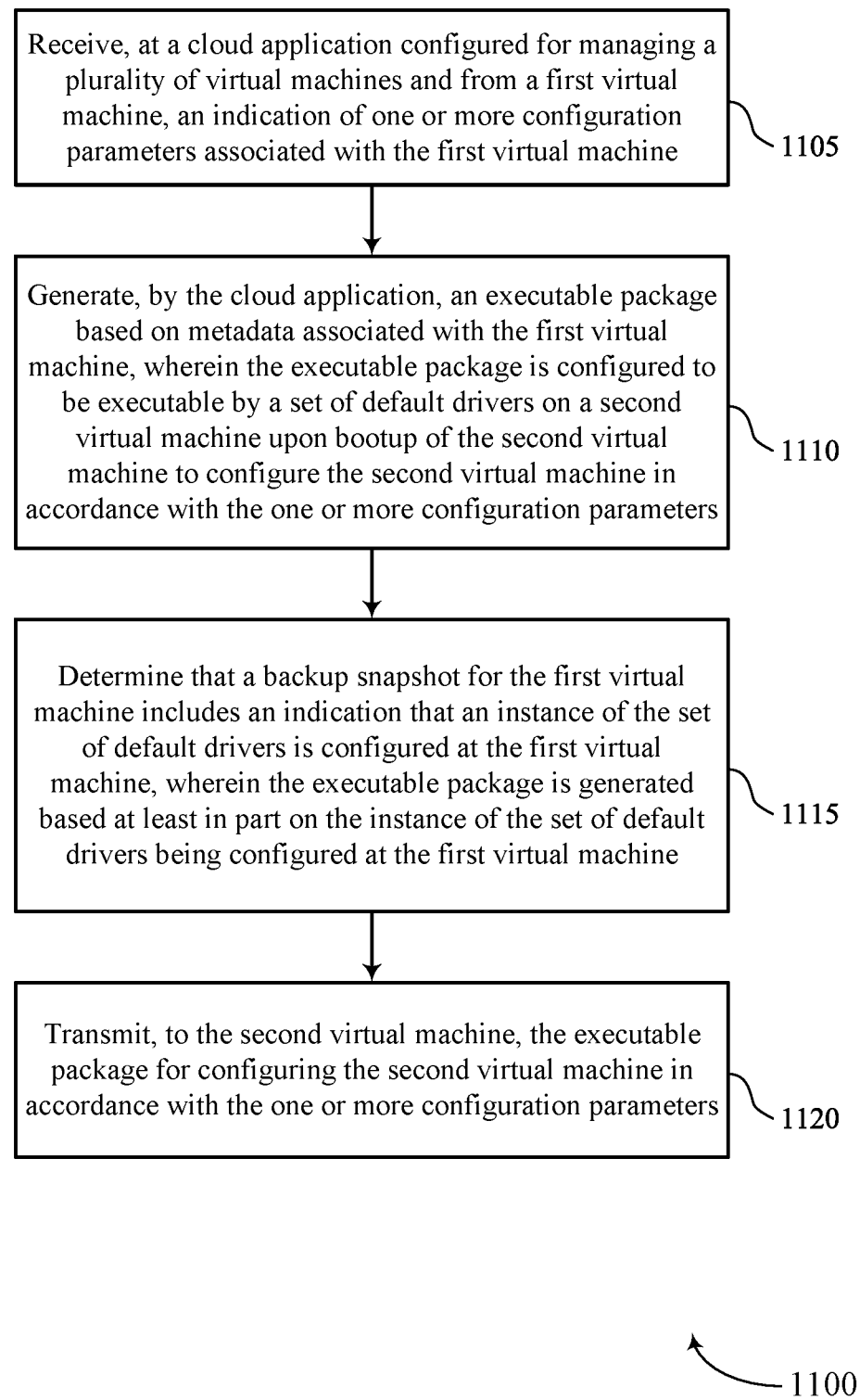

FIG. 11 shows a flowchart illustrating a method 1100 that supports techniques for package injection for virtual machine configuration in accordance with aspects of the present disclosure. The operations of the method 1100 may be implemented by a server or its components as described herein. For example, the operations of the method 1100 may be performed by a server as described with reference to FIGS. 1 through 8. In some examples, a server may execute a set of instructions to control the functional elements of the server to perform the described functions. Additionally or alternatively, the server may perform aspects of the described functions using special-purpose hardware.

At 1105, the method may include receiving, at a cloud application configured for managing a plurality of virtual machines and from a first virtual machine, an indication of one or more configuration parameters associated with the first virtual machine. The operations of 1105 may be performed in accordance with examples as disclosed herein. In some examples, aspects of the operations of 1105 may be performed by a configuration parameter interface 725 as described with reference to FIG. 7.

At 1110, the method may include generating, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters. The operations of 1110 may be performed in accordance with examples as disclosed herein. In some examples, aspects of the operations of 1110 may be performed by an executable package component 730 as described with reference to FIG. 7.

At 1115, the method may include determining that a backup snapshot for the first virtual machine includes an indication that an instance of the set of default drivers is configured at the first virtual machine, wherein the executable package is generated based at least in part on the instance of the set of default drivers being configured at the first virtual machine. The operations of 1115 may be performed in accordance with examples as disclosed herein. In some examples, aspects of the operations of 1115 may be performed by a failover component 740 as described with reference to FIG. 7.

At 1120, the method may include transmitting, to the second virtual machine, the executable package for configuring the second virtual machine in accordance with the one or more configuration parameters. The operations of 1120 may be performed in accordance with examples as disclosed herein. In some examples, aspects of the operations of 1120 may be performed by an executable package interface 735 as described with reference to FIG. 7.

Figure 12:
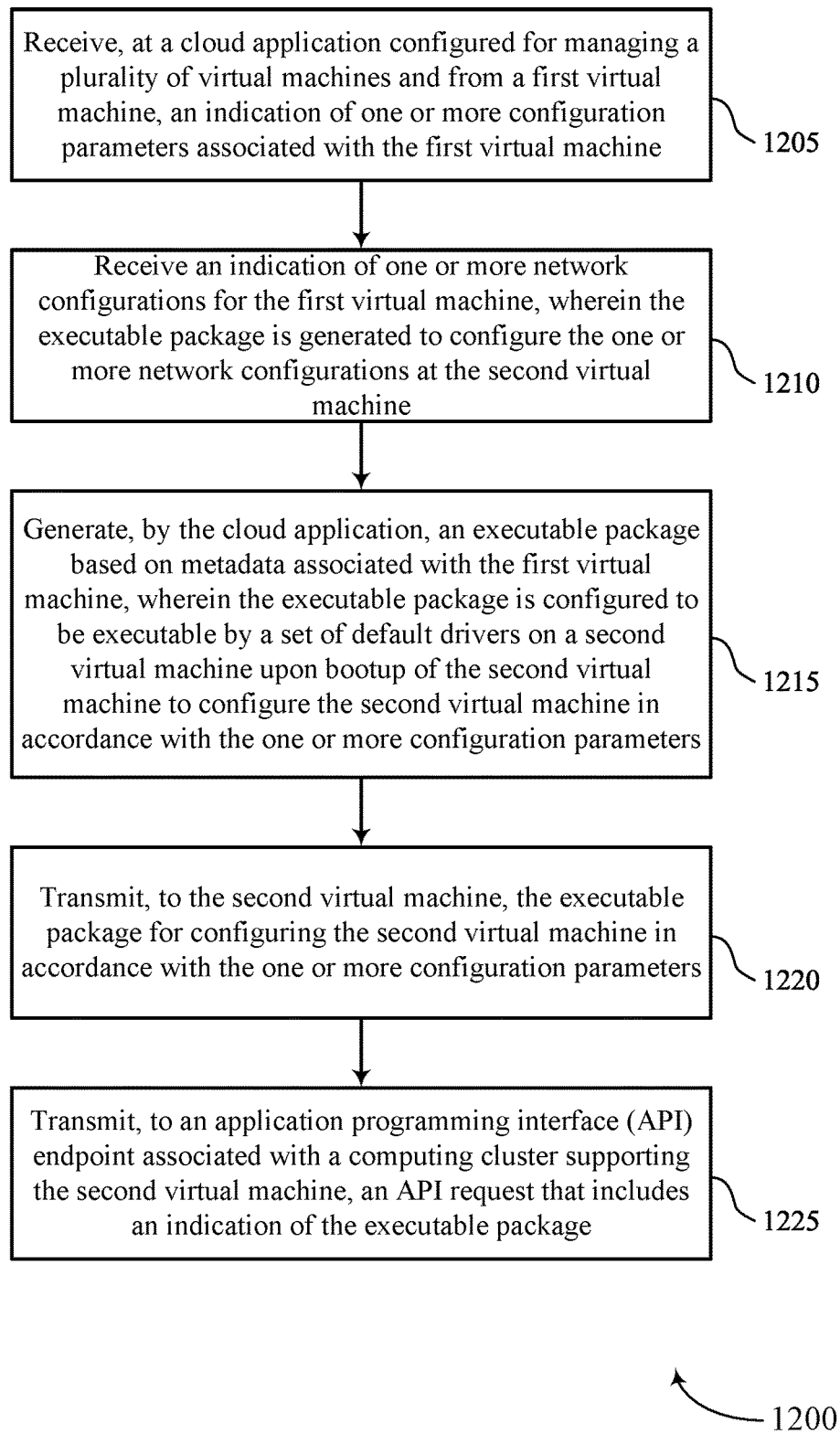

FIG. 12 shows a flowchart illustrating a method 1200 that supports techniques for package injection for virtual machine configuration in accordance with aspects of the present disclosure. The operations of the method 1200 may be implemented by a server or its components as described herein. For example, the operations of the method 1200 may be performed by a server as described with reference to FIGS. 1 through 8. In some examples, a server may execute a set of instructions to control the functional elements of the server to perform the described functions. Additionally or alternatively, the server may perform aspects of the described functions using special-purpose hardware.

At 1205, the method may include receiving, at a cloud application configured for managing a plurality of virtual machines and from a first virtual machine, an indication of one or more configuration parameters associated with the first virtual machine. The operations of 1205 may be performed in accordance with examples as disclosed herein. In some examples, aspects of the operations of 1205 may be performed by a configuration parameter interface 725 as described with reference to FIG. 7.

At 1210, the method may include receiving an indication of one or more network configurations for the first virtual machine, wherein the executable package is generated to configure the one or more network configurations at the second virtual machine. The operations of 1210 may be performed in accordance with examples as disclosed herein. In some examples, aspects of the operations of 1210 may be performed by a configuration parameter interface 725 as described with reference to FIG. 7.

At 1215, the method may include generating, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters. The operations of 1215 may be performed in accordance with examples as disclosed herein. In some examples, aspects of the operations of 1215 may be performed by an executable package component 730 as described with reference to FIG. 7.

At 1220, the method may include transmitting, to the second virtual machine, the executable package for configuring the second virtual machine in accordance with the one or more configuration parameters. The operations of 1220 may be performed in accordance with examples as disclosed herein. In some examples, aspects of the operations of 1220 may be performed by an executable package interface 735 as described with reference to FIG. 7.

At 1225, the method may include transmitting, to an API endpoint associated with a computing cluster supporting the second virtual machine, an API request that includes an indication of the executable package. The operations of 1225 may be performed in accordance with examples as disclosed herein. In some examples, aspects of the operations of 1225 may be performed by an executable package interface 735 as described with reference to FIG. 7.

A method for managing a virtual machine environment is described. The method may include receiving, at a cloud application configured for managing a plurality of virtual machines and from a first virtual machine, an indication of one or more configuration parameters associated with the first virtual machine, generating, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters, and transmitting, to the second virtual machine, the executable package for configuring the second virtual machine in accordance with the one or more configuration parameters.

An apparatus for managing a virtual machine environment is described. The apparatus may include a processor, memory coupled with the processor, and instructions stored in the memory. The instructions may be executable by the processor to cause the apparatus to receive, at a cloud application configured for managing a plurality of virtual machines and from a first virtual machine, an indication of one or more configuration parameters associated with the first virtual machine, generate, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters, and transmit, to the second virtual machine, the executable package for configuring the second virtual machine in accordance with the one or more configuration parameters.

Another apparatus for managing a virtual machine environment is described. The apparatus may include means for receiving, at a cloud application configured for managing a plurality of virtual machines and from a first virtual machine, an indication of one or more configuration parameters associated with the first virtual machine, means for generating, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters, and means for transmitting, to the second virtual machine, the executable package for configuring the second virtual machine in accordance with the one or more configuration parameters.

A non-transitory computer-readable medium storing code for managing a virtual machine environment is described. The code may include instructions executable by a processor to receive, at a cloud application configured for managing a plurality of virtual machines and from a first virtual machine, an indication of one or more configuration parameters associated with the first virtual machine, generate, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters, and transmit, to the second virtual machine, the executable package for configuring the second virtual machine in accordance with the one or more configuration parameters.

Some examples of the method, apparatuses, and non-transitory computer-readable medium described herein may further include operations, features, means, or instructions for determining that the first virtual machine may be subject to a failover procedure, wherein the executable package may be generated and transmitted to the second virtual machine based at least in part on determining that the first virtual machine may be subject to the failover procedure.

Some examples of the method, apparatuses, and non-transitory computer-readable medium described herein may further include operations, features, means, or instructions for determining that a backup snapshot for the first virtual machine includes an indication that an instance of the set of default drivers may be configured at the first virtual machine, wherein the executable package may be generated based at least in part on the instance of the set of default drivers being configured at the first virtual machine.

In some examples of the method, apparatuses, and non-transitory computer-readable medium described herein, at least the backup snapshot for the first virtual machine may be replicated onto the second virtual machine by the set of default drivers on the second virtual machine and based at least in part on the executable package.

In some examples of the method, apparatuses, and non-transitory computer-readable medium described herein, receiving the indication of one or more configuration parameters may include operations, features, means, or instructions for receiving an indication of one or more network configurations for the first virtual machine, wherein the executable package may be generated to configure the one or more network configurations at the second virtual machine.

In some examples of the method, apparatuses, and non-transitory computer-readable medium described herein, the one or more network configurations comprise one or more internet protocol addresses, a network interface control configuration, or a combination thereof.

In some examples of the method, apparatuses, and non-transitory computer-readable medium described herein, transmitting the executable package may include operations, features, means, or instructions for transmitting, to an API endpoint associated with a computing cluster supporting the second virtual machine, an API request that includes an indication of the executable package.

In some examples of the method, apparatuses, and non-transitory computer-readable medium described herein, the executable package may be input to a shared location associated with the set of default drivers for execution based at least in part on the API request.

In some examples of the method, apparatuses, and non-transitory computer-readable medium described herein, generating the executable package may include operations, features, means, or instructions for identifying an operating system executed by the first virtual machine and generating the executable package that may be compatible with the operating system.

Some examples of the method, apparatuses, and non-transitory computer-readable medium described herein may further include operations, features, means, or instructions for receiving, at a user interface supported by the cloud application, an input indicative of a request to generate the executable package, wherein the executable package may be generated based in part on receiving the input.

Some examples of the method, apparatuses, and non-transitory computer-readable medium described herein may further include operations, features, means, or instructions for receiving, at a user interface supported by the cloud application, an input that may be indicative of a script, wherein the executable package may be generated to include the script that may be executable by the second virtual machine.

Some examples of the method, apparatuses, and non-transitory computer-readable medium described herein may further include operations, features, means, or instructions for receiving, from the first virtual machine, an indication of the metadata associated with the first virtual machine.

In some examples of the method, apparatuses, and non-transitory computer-readable medium described herein, the metadata comprises a name associated with the first virtual machine, a type of the first virtual machine, an operating system version executed by the first virtual machine, an operating system type executed by the first virtual machine, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing a virtual machine environment, comprising:
   receiving, at a cloud application configured for managing a plurality of virtual machines and from a first virtual machine, an indication of one or more configuration parameters associated with the first virtual machine;
   generating, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters; and
   transmitting, to the second virtual machine, the executable package for configuring the second virtual machine in accordance with the one or more configuration parameters.

2. The method of claim 1, further comprising:
   determining that the first virtual machine is subject to a failover procedure, wherein the executable package is generated and transmitted to the second virtual machine based at least in part on determining that the first virtual machine is subject to the failover procedure.

3. The method of claim 1, further comprising:
   determining that a backup snapshot for the first virtual machine includes an indication that an instance of the set of default drivers is configured at the first virtual machine, wherein the executable package is generated based at least in part on the instance of the set of default drivers being configured at the first virtual machine.

4. The method of claim 3, wherein at least the backup snapshot for the first virtual machine is replicated onto the second virtual machine by the set of default drivers on the second virtual machine and based at least in part on the executable package.

5. The method of claim 1, wherein receiving the indication of one or more configuration parameters comprises:
   receiving an indication of one or more network configurations for the first virtual machine, wherein the executable package is generated to configure the one or more network configurations at the second virtual machine.

6. The method of claim 5, wherein the one or more network configurations comprise one or more internet protocol addresses, a network interface control configuration, or a combination thereof.

7. The method of claim 1, wherein transmitting the executable package comprises:
   transmitting, to an application programming interface (API) endpoint associated with a computing cluster supporting the second virtual machine, an API request that includes an indication of the executable package.

8. The method of claim 7, wherein the executable package is input to a shared location associated with the set of default drivers for execution based at least in part on the API request.

9. The method of claim 1, wherein generating the executable package comprises:
identifying an operating system executed by the first virtual machine; and
generating the executable package that is compatible with the operating system.

10. The method of claim 1, further comprising:
receiving, at a user interface supported by the cloud application, an input indicative of a request to generate the executable package, wherein the executable package is generated based in part on receiving the input.

11. The method of claim 1, further comprising:
receiving, at a user interface supported by the cloud application, an input that is indicative of a script, wherein the executable package is generated to include the script that is to be executable by the second virtual machine.

12. The method of claim 1, further comprising:
receiving, from the first virtual machine, an indication of the metadata associated with the first virtual machine.

13. The method of claim 1, wherein the metadata comprises a name associated with the first virtual machine, a type of the first virtual machine, an operating system version executed by the first virtual machine, an operating system type executed by the first virtual machine, or a combination thereof.

14. An apparatus for managing a virtual machine environment, comprising:
a processor;
memory coupled with the processor; and
instructions stored in the memory and executable by the processor to cause the apparatus to:
receive, at a cloud application configured for managing a plurality of virtual machines and from a first virtual machine, an indication of one or more configuration parameters associated with the first virtual machine;
generate, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters; and
transmit, to the second virtual machine, the executable package for configuring the second virtual machine in accordance with the one or more configuration parameters.

15. The apparatus of claim 14, wherein the instructions are further executable by the processor to cause the apparatus to:
determine that the first virtual machine is subject to a failover procedure, wherein the executable package is generated and transmitted to the second virtual machine based at least in part on determining that the first virtual machine is subject to the failover procedure.

16. The apparatus of claim 14, wherein the instructions are further executable by the processor to cause the apparatus to:
determine that a backup snapshot for the first virtual machine includes an indication that an instance of the set of default drivers is configured at the first virtual machine, wherein the executable package is generated based at least in part on the instance of the set of default drivers being configured at the first virtual machine.

17. The apparatus of claim 16, wherein at least the backup snapshot for the first virtual machine is replicated onto the second virtual machine by the set of default drivers on the second virtual machine and based at least in part on the executable package.

18. A non-transitory computer-readable medium storing code for managing a virtual machine environment, the code comprising instructions executable by a processor to:
receive, at a cloud application configured for managing a plurality of virtual machines and from a first virtual machine, an indication of one or more configuration parameters associated with the first virtual machine;
generate, by the cloud application, an executable package based on metadata associated with the first virtual machine, wherein the executable package is configured to be executable by a set of default drivers on a second virtual machine upon bootup of the second virtual machine to configure the second virtual machine in accordance with the one or more configuration parameters; and
transmit, to the second virtual machine, the executable package for configuring the second virtual machine in accordance with the one or more configuration parameters.

19. The non-transitory computer-readable medium of claim 18, wherein the instructions are further executable by the processor to:
determine that the first virtual machine is subject to a failover procedure, wherein the executable package is generated and transmitted to the second virtual machine based at least in part on determining that the first virtual machine is subject to the failover procedure.

20. The non-transitory computer-readable medium of claim 18, wherein the instructions are further executable by the processor to:
determine that a backup snapshot for the first virtual machine includes an indication that an instance of the set of default drivers is configured at the first virtual machine, wherein the executable package is generated based at least in part on the instance of the set of default drivers being configured at the first virtual machine.

* * * * *